United States Patent
Tanaka et al.

(10) Patent No.: US 6,829,525 B2
(45) Date of Patent: Dec. 7, 2004

(54) MOVEMENT CONDITION COMPUTING DEVICE, METHOD, AND PROGRAM, AND RECORDING MEDIUM RECORDING SAID PROGRAM, AND NAVIGATION DEVICE

(75) Inventors: Kazuaki Tanaka, Kawagoe (JP); Seiji Goto, Kawagoe (JP); Isao Endo, Kawagoe (JP); Tatsuya Okamoto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/423,039

(22) Filed: Apr. 25, 2003

(65) Prior Publication Data

US 2003/0236607 A1 Dec. 25, 2003

(30) Foreign Application Priority Data

Apr. 26, 2002 (JP) ..................................... 2002-127400

(51) Int. Cl.⁷ ............................................... G06F 7/00
(52) U.S. Cl. ............................... 701/1; 701/70; 701/79; 701/200; 180/168; 180/170
(58) Field of Search ............................... 701/1, 33, 70, 701/79, 200–201, 207; 180/168–170

(56) References Cited

U.S. PATENT DOCUMENTS

| | | | | |
|---|---|---|---|---|
| 3,996,590 A | * | 12/1976 | Hammack | 342/465 |
| 4,922,447 A | | 5/1990 | Reichel | 364/561 |
| 6,218,961 B1 | * | 4/2001 | Gross et al. | 340/903 |
| 6,377,888 B1 | * | 4/2002 | Olch | 701/207 |

FOREIGN PATENT DOCUMENTS

| | | |
|---|---|---|
| DE | 199 16 529 C1 | 1/2001 |
| EP | 0 488 594 A1 | 6/1992 |
| EP | 1 256 810 A2 | 11/2002 |

OTHER PUBLICATIONS

Patent Abstracts of Japan vol. 1998, No. 11, Sep. 30, 1998 & JP 10 170303 A (Toyo Commun Equip Co Ltd), Jun. 26, 1998 *abstract*.

* cited by examiner

Primary Examiner—Gertrude A. Jeanglaude
(74) Attorney, Agent, or Firm—Armstrong, Kratz, Quintos, Hanson & Brooks, LLP

(57) ABSTRACT

A velocity information acquisition section 21 acquires velocity information on the velocity of a vehicle and records this acquired information in a velocity information recording section 27. A state judgment section 23 judges start and stop states of the vehicle based on state information indicating the start and stop states of the vehicle that was acquired at a state information acquisition section 22. After this judgment, a minimum output velocity computing section 24 accurately computes, based on the velocity information recorded in velocity information recording section 27, a minimum output velocity in a period in which a vehicle velocity detection circuit 10 cannot detect velocity information. A movement condition computing section 25 can appropriately compute a relative movement distance or a relative movement velocity of the vehicle based on the state information acquired at state information acquisition section 22 and the minimum output velocity computed at minimum output velocity computing section 24.

16 Claims, 18 Drawing Sheets

MOVEMENT CONDITION COMPUTING DEVICE, METHOD, AND PROGRAM, AND RECORDING MEDIUM RECORDING SAID PROGRAM, AND NAVIGATION DEVICE

BACKGROUND OF THE INVENTION

1. Field of the Invention

The present invention relates to a movement condition computing device, which computes movement distance information or movement velocity information on a mobile body even when velocity information on the velocity of the mobile body cannot be acquired during travel of the mobile body, and also relates to a movement condition computing method, a movement condition computing program, a recording medium recording this program, and a navigation device.

2. Description of Related Art

Vehicle-installed navigation devices have been known since prior, and such a device is installed in a vehicle, which is mobile body, for detection of the vehicle's present position and display of the vehicle's present position on a map.

This vehicle-installed navigation device is equipped with a GPS receiver, a computing device, a map storage device, and a display device.

With this vehicle-installed navigation device, the abovementioned computing device generates distance information and traveling direction information on the vehicle based on sensor outputs output from a vehicle velocity sensor and a yaw rate sensor.

Also, this vehicle-installed navigation device detects a relative movement distance and a relative movement direction of the vehicle at each unit time based on the distance information and traveling direction information. The navigation device then computes the present position of the vehicle from position information obtained from the GPS receiver and position information obtained based on the relative movement distance and relative movement direction. Thereafter, the map information stored in the map storage device is read and the computed present position is overlapped onto and displayed along with the map information.

In recent years, due to an increased inclination towards vehicle safety, preventive safety devices have come to be equipped in vehicles. Many vehicles are already equipped with an ABS (Anti-lock Brake System), which is a representative form of preventive safety device.

A vehicle velocity pulse signal, which the abovementioned vehicle velocity sensor acquires from a vehicle, may take on various forms, such as that acquired from a speedometer-related part of the vehicle, that acquired from an abovementioned ABS-related part, etc. In a specific example, which is employed in some vehicle models and in which a vehicle velocity pulse signal is acquired from an ABS-related part, an ABS sensor is mounted to a hub unit used at a wheel of a vehicle and the rotation speed of this wheel is detected. Based on this detected rotation speed, a sensor signal is output to an ECU (Electric Control Unit) of the vehicle. Thereafter, this ECU outputs the input sensor signal as the vehicle velocity pulse signal, etc.

Here, the vehicle velocity sensor, which is equipped in the vehicle-installed navigation device, detects this vehicle velocity pulse signal and the abovementioned computing device detects the leading edges or trailing edges of the detected vehicle velocity pulse signal and computes the number of pulses. A predetermined distance factor is then used to compute the relative movement distance of the vehicle by the following [Equation 1].

Relative movement distance=Number of vehicle velocity pulses× Distance factor    [Equation 1]

However, with an ABS sensor, when a vehicle is traveling at low velocity, a state in which the wheel is rotating cannot be distinguished from a state in which the wheel is locked. That is, a sensor signal will not be output from the ABS sensor to an ECU in this case. The ECU thus cannot generate the vehicle velocity pulse signal when the vehicle is traveling at less than or equal to a predetermined velocity.

In this case, the vehicle-installed navigation device also cannot acquire the vehicle velocity pulse signal when the vehicle is traveling at less than or equal to the predetermined velocity. That is, when a vehicle is traveling at less than or equal to the predetermined velocity, the relative movement distance or relative movement velocity of the vehicle cannot be computed.

SUMMARY OF THE INVENTION

A main object of the present invention is to provide a movement condition computing device, which can appropriately compute the relative movement distance or relative movement velocity of a mobile body as well as a movement condition computing method, a movement condition computing program, a recording medium recording this program, and a navigation device.

This invention's movement condition computing device comprises: a velocity information acquisition section, acquiring velocity information concerning the velocity of a mobile body; a minimum output velocity computing section, computing, when the abovementioned velocity information acquisition section cannot acquire the abovementioned velocity information during movement of the abovementioned mobile body, a minimum output velocity of a point in time at which the abovementioned velocity information acquisition section could acquire the abovementioned velocity information; a state information acquisition section, acquiring state information on at least one of start and stop states of the abovementioned mobile body; and a movement condition computing section, computing at least one of movement distance information and movement velocity information on the abovementioned mobile body based on the minimum output velocity computed by the abovementioned minimum output velocity computing section and the state information acquired by the abovementioned state information acquisition section.

This invention's movement condition computing device comprises: a velocity information acquisition section, acquiring velocity information concerning the velocity of a mobile body; an acceleration information acquisition section, acquiring acceleration information concerning the acceleration of the abovementioned mobile body; and a movement condition computing section, computing, when the abovementioned velocity information acquisition section cannot acquire the abovementioned velocity information during movement of the abovementioned mobile body, at least one of movement distance information and movement velocity information on the abovementioned mobile body based on the acceleration information acquired by the abovementioned acceleration information acquisition section.

This invention's movement condition computing method comprises the steps of: acquiring velocity information concerning the velocity of a mobile body; computing, when the abovementioned velocity information cannot be acquired during movement of the abovementioned mobile body, a minimum output velocity of a point in time at which the abovementioned velocity information could be acquired; acquiring state information concerning at least one of start and stop states of the abovementioned mobile body; and computing at least one of movement distance information and movement velocity information on the abovementioned mobile body based on the abovementioned minimum output velocity that has been computed and the abovementioned state information that has been acquired.

This invention's program is a movement condition computing program, characterized in making a computer execute this invention's movement condition computing method described above.

This invention's recording medium is a recording medium recording a movement condition computing program characterized in storing this invention's movement condition computing program described above in a manner enabling reading by a computer.

This invention's navigation device comprises: this invention's movement condition computing device described above; and a present position determination section, determining the present position of a mobile body based on movement distance information and movement velocity information computed by the movement condition computing device.

DETAILED DESCRIPTION OF PREFERRED EMBODIMENT(S)

The respective embodiments of this invention shall now be described based on the drawings.

[First Embodiment]

[Arrangement of a Navigation Device]

Figure 1:
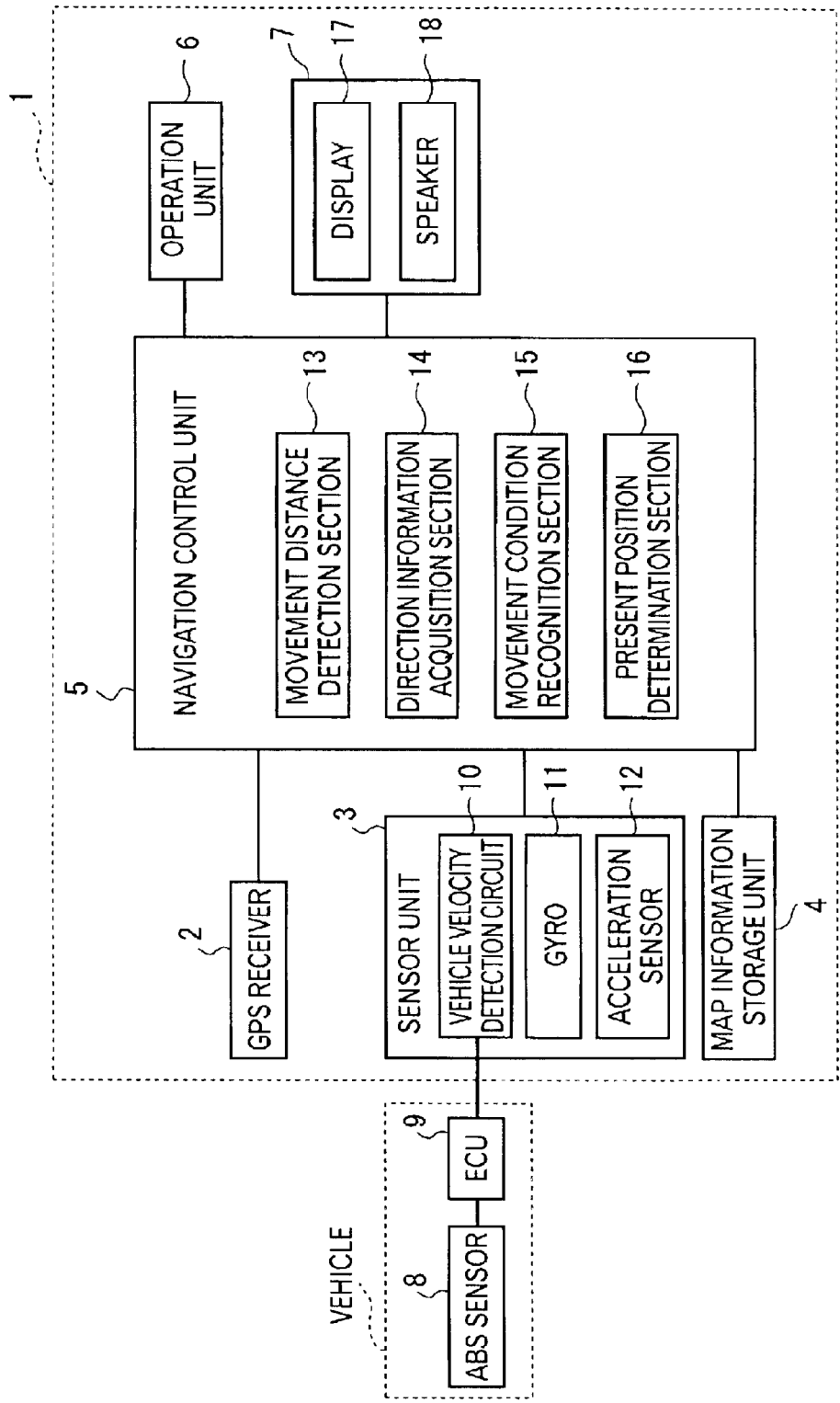
FIG. 1 is a diagram, showing the general arrangement of a navigation device by this invention.

FIG. 1 is a block diagram, showing the general arrangement of a navigation device by this invention. 1 is a vehicle-installed navigation device, and this navigation device 1 is installed in a vehicle, which is a mobile body, to perform display of the present position of the vehicle, guidance, etc. This navigation device 1 is equipped with a GPS receiver 2, a sensor unit 3, a map information storage unit 4, a navigation control unit 5, an operation unit 6, and a notification unit 7. The vehicle is equipped with an ABS sensor 8 and an ECU 9, and a vehicle velocity detection circuit 10 of sensor unit 3 to be described later inputs signals from this ABS sensor 8 and ECU 9.

Here, ABS sensor 8 is used for an ABS, which is a preventive safety device of the vehicle. This ABS sensor 8 is mounted to a hub unit used in a wheel of the vehicle, detects the rotation speed of this wheel, and outputs a sensor signal, based on the detected rotation speed, to ECU 9 of the vehicle.

After inputting the sensor signal from ABS sensor 8, ECU 9 performs waveform modification of the input sensor signal to generate a vehicle velocity pulse signal and outputs this generated vehicle velocity pulse signal to sensor unit 3.

This ABS sensor 8 and ECU 9 generate the vehicle velocity pulse signal, and though ABS sensor 8 is described here, the sensor is not limited thereto. It is sufficient that the sensor be one that detects velocity information on the vehicle and, for example, a sensor installed at a speedometer-related part may be used instead.

GPS receiver 2 detects absolute position information on the vehicle, expressed as latitude and longitude information, and outputs this vehicle position information to navigation control unit 5.

Sensor unit 3 detects the displacement that accompanies movement of the vehicle and is equipped with a vehicle velocity detection circuit 10, a gyro 11, and an acceleration sensor 12.

Vehicle velocity detection circuit 10 detects the vehicle velocity pulse signal output from ECU 9 and outputs the signal to navigation control unit 5.

Gyro 11 detects the vehicle's azimuth angle, that is, the traveling direction in which the vehicle advances. This gyro 11 converts the detected traveling direction to azimuth angle data as traveling direction information in the form, for example, of pulses, voltage, etc., and outputs the traveling direction information to navigation control unit 5. Though a gyro 11 is employed here, a geomagnetic sensor, which detects the absolute direction, etc., may be employed instead.

Acceleration sensor 12 detects the acceleration in the vehicle's traveling direction. This acceleration sensor 12 converts the detected acceleration to a sensor output value in the form, for example, of pulses, voltage, etc., and outputs this value to navigation control unit 5.

Map information storage unit 4 stores map information. This map information storage unit 4 is equipped, for example, with a DVD-ROM (Digital Video (or Versatile) Disk-Read Only Memory) drive or a CD-ROM (Compact Disk-Read Only Memory) drive, etc., which respectively reproduces, under the control of navigation control unit 5, the contents of a DVD-ROM disk or a CD-ROM disk in which map information is stored.

Navigation control unit 5 controls the operation of the entire navigation device 1. This navigation control unit 5 comprises a CPU, etc., reads and executes a control program stored in an unillustrated ROM, etc., outputs control signals to the respective components of navigation device 1, and performs input and output of data. Though specific illustration will be omitted, navigation control unit 5 is thus equipped in its interior with a CPU, ROM, RAM, and bus lines that connect these components.

This navigation control unit 5 is also equipped with a movement distance detection section 13, which is a movement condition computing device, a direction information acquisition section 14, a movement condition recognition section 15, and a present position determination section 16.

Though the specifics shall be given later, movement distance detection section 13 acquires the vehicle velocity pulse signal detected at vehicle velocity detection circuit 10 and computes the relative movement distance or relative movement velocity of the vehicle. Normally, the relative movement distance is computed by the following [Equation 2] based on the number of vehicle velocity pulses, which in turn is based on the acquired vehicle velocity pulse signal, and a distance per pulse (distance factor value), which is set as a predetermined value.

Relative movement distance=Number of vehicle velocity pulses× Distance factor value [Equation 2]

Or, the relative movement velocity is calculated by the following [Equation 3], using the pulse width (time) of the vehicle velocity pulse signal and the distance factor value.

Relative movement velocity=Distance factor value/Pulse width [Equation 3]

The computed relative movement distance or relative movement velocity is output to movement condition recognition section 15.

Direction information acquisition section 14 acquires the azimuth angle data output from gyro 11, computes the relative movement direction of the vehicle, and outputs the computed relative movement direction of the vehicle to movement condition recognition section 15.

Movement condition recognition section 15 computes the vehicle's relative movement distance and relative movement direction for each unit time based on the relative movement distance or relative movement velocity computed at movement distance detection section 13 and the relative movement direction computed at direction information acquisition section 14 and detects the movement condition of the vehicle based on the accumulation of the relative movement distance and relative movement direction. The detected movement condition of the vehicle is then output to present position determination section 14.

Present position determination section 16 determines the present position of the vehicle. To be more specific, the vehicle's movement condition detected at movement condition recognition section 15 and the vehicle's position information detected at GPS receiver 2 are acquired. The two of information are compared and collated with the map information stored in map information storage unit 4 and the present position is determined by a map matching process, etc. The determined present position of the vehicle is then displayed on a display 17 of notification unit 7 to be described later.

Operation unit 6 has various unillustrated operation buttons, for example, for instructing the display of the traveling condition, which is the vehicle's movement condition, and other instructions for operating navigation device 1 as suited. Upon input operation of these operation buttons, operation unit 6 suitably outputs predetermined signals to navigation control unit 5 for setting and inputting various conditions, such as the operation details of navigation device 1. This operation unit 6 is not limited to an arrangement for input operations by section of operation buttons but may also be arranged for the setting and inputting of various conditions by input operations by section of a touch panel, voice input operations, etc., Notification unit 7 is controlled by navigation control unit 5 and notifies the present position of the vehicle. This notification unit 7 is equipped with display 17 and a speaker 18.

Under the instruction of navigation control unit 5, display 17 displays the map data, stored in map information storage unit 4, in various modes and displays the vehicle's present position in an overlapping manner. Also in addition to the function of displaying the map data in such a manner, display 17 also suitably displays TV image data received by an unillustrated TV receiver, image data stored in an optical disk, magnetic disk, or other recording medium, and read by a drive, etc. To be more specific, a liquid crystal, organic EL (electroluminescence), PDP (Plasma Display Panel), or CRT (Cathode-Ray Tube), etc., is used as the display.

Speaker 18 outputs various information, such as intersection information based on the vehicle's present position, etc., under the instruction of navigation control unit 5.

[Arrangement of the Movement Distance Detection Section]

Figure 2:
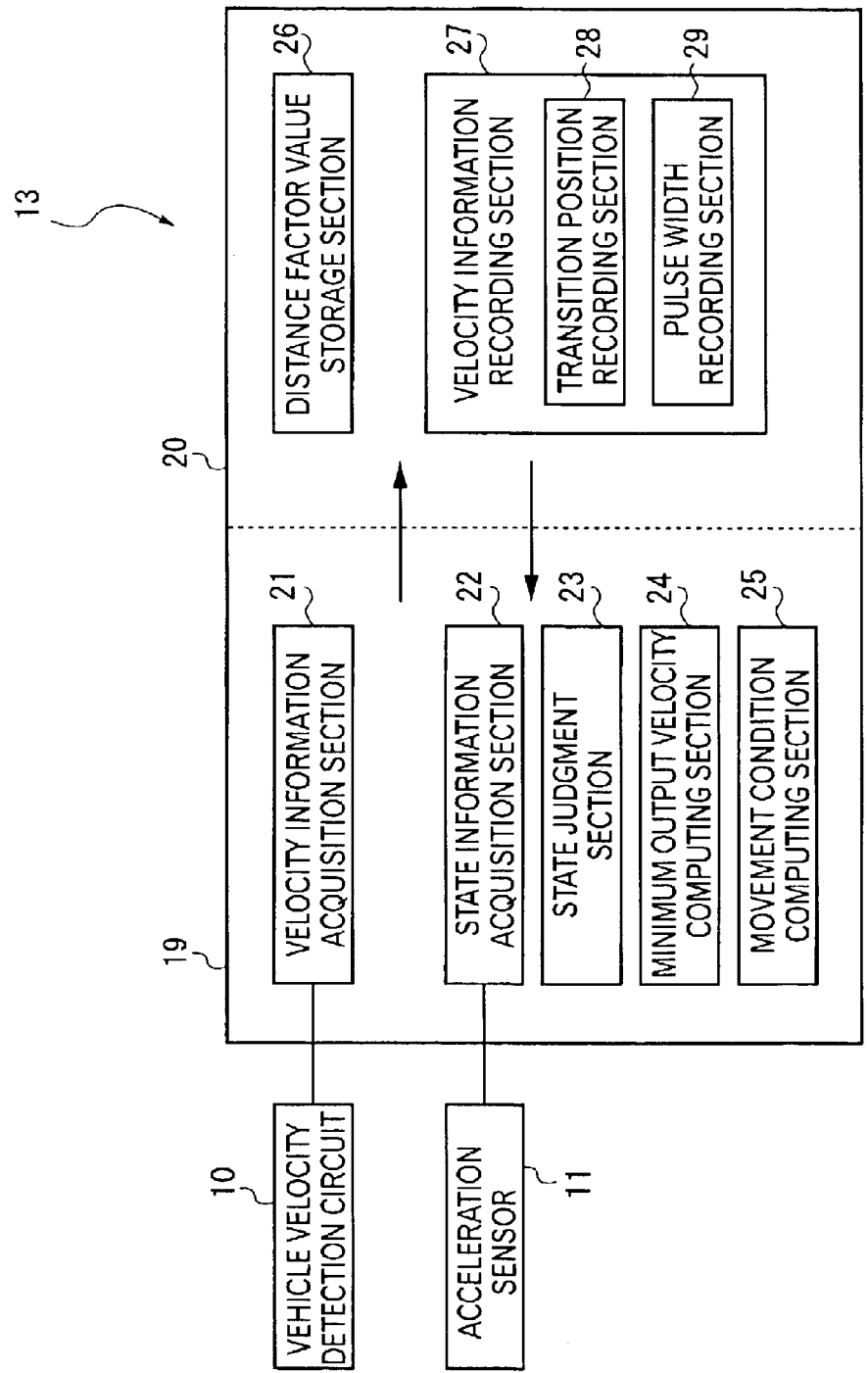
FIG. 2 is a diagram, showing the general arrangement of a movement distance detection section, which is a movement condition computing device of a first embodiment of this invention.

FIG. 2 is a diagram, showing the general arrangement of movement distance detection section 13, which is the movement condition computing device of the first embodiment. In FIG. 2, 13 is the movement distance detection section, and this movement distance detection section 13 computes the relative movement distance or relative movement velocity of the vehicle. This movement distance detection section 13 is equipped with a processing unit 19 and a database 20.

Processing unit 19 inputs data output from the respective components of navigation device 1 and performs predetermined computing processes based on these data. Processing unit 19 is equipped with a velocity information acquisition section 21, a state information acquisition section 22, a state judgment section 23, a minimum output velocity computing section 24, and a movement condition computing section 25.

Velocity information acquisition section 21 acquires the vehicle velocity pulse signal detected at vehicle velocity detection circuit 10 and computes pulse widths (times), which are periods based on the leading edges or trailing edges of the acquired vehicle velocity pulse signal.

Figure 3:
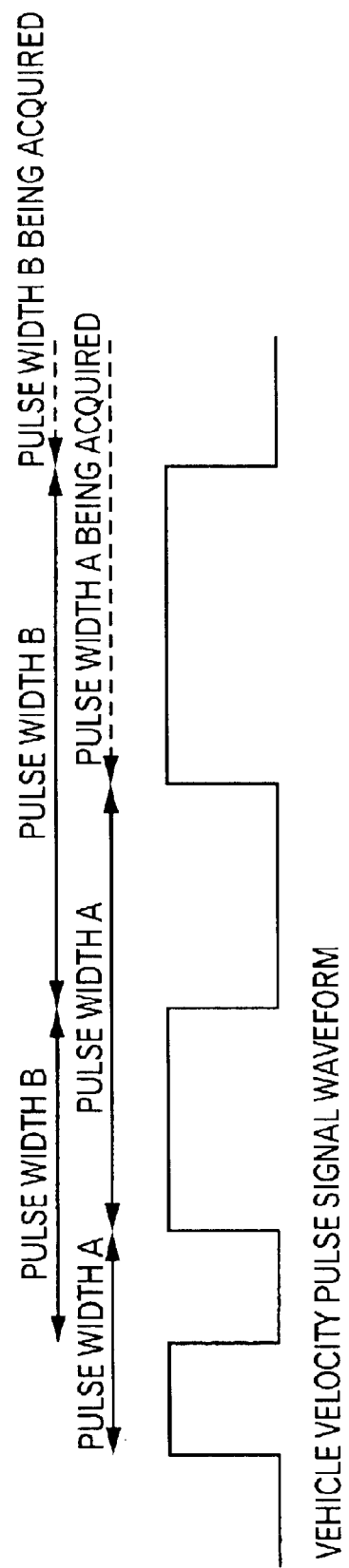
FIG. 3 is a diagram for explaining the acquisition of pulse widths by a velocity information acquisition section of each embodiment of this invention.

For specifics, an example of a case where rectangular waves are used as such pulses shall be described. As shown in FIG. 3, velocity information acquisition section 21 detects the state transitions at the leading edges of the signal and the trailing edges of the signal to acquire the respective transition positions (times) and record them in database 20. Pulse widths are then computed based on transition positions (times) recorded in advance in database 20 and on the acquired transition positions (times).

That is, velocity information acquisition section 21 computes pulse widths A and pulse widths B as shown in FIG. 3. These computed pulse widths A and pulse widths B are recorded in database 20.

This velocity information acquisition section 21 also computes the number of vehicle velocity pulses from the vehicle velocity pulse signal that has been acquired within a predetermined period. This velocity information acquisition section 21 then outputs the pulse widths of the acquired vehicle velocity pulse signal and the computed number of vehicle velocity pulses to movement condition computing section 25.

State information acquisition section 22 inputs the sensor signal output from acceleration sensor 12 and acquires state information concerning start and stop states of the vehicle. The acquired state information is output to state judgment section 23. Though the sensor signal from acceleration sensor 12 is input here, the vehicle's state information may be acquired by input of the output signal from gyro 11 instead.

State judgment section 23 acquires the state information output from state information acquisition section 22 and judges the start and stop states of the vehicle. After this judgment, a signal is output to minimum output velocity computing section 24 and the judged start position (time) and stop position (time) are output to movement condition computing section 25.

Here, the vehicle's start state and stop state cannot be judged from the vehicle velocity pulse signal acquired at velocity information acquisition section 21. ABS sensor 8, which is the source of generation of this vehicle velocity pulse signal, detects the rotation of a wheel of the vehicle, and when the vehicle is traveling at low speed, the pulse width (time) acquired at velocity information acquisition section 21 will be extremely long. That is, if the vehicle stops or starts during the acquisition of this pulse width, vehicle information acquisition section 21 will acquire the pulse width that includes this stop or start state of the vehicle. Movement condition calculation section 25 cannot compute the vehicle's relative movement distance or relative movement velocity with good precision using a pulse width acquired in such a manner or the number of vehicle velocity pulses based on the vehicle velocity pulse signal.

Thus in order to compute the relative movement distance or relative movement velocity with good precision in a state where the vehicle velocity pulse signal cannot be acquired at velocity information acquisition section 21, the acceleration of the vehicle in a state close to the stopping or starting of the vehicle is computed at minimum output velocity computing section 24.

Upon input of the signal from state judgment section 23, minimum output velocity computing section 24 computes a minimum output velocity immediately prior to the stopping of the vehicle or after the starting of the vehicle based on the pulse widths A or pulse widths B recorded in database 20. The computed minimum output velocity is output to movement condition computing section 25.

Movement condition computing section 25 computes the relative movement distance and the relative movement velocity respectively in two processes. To be more specific, in a first process, movement condition computing section 25 acquires the number of vehicle velocity pulses counted at velocity information acquisition section 21. The movement distance of the vehicle per pulse (distance factor value), which is recorded in database 20, is also read. Then based on this number of vehicle velocity pulses and the distance factor value, the relative movement distance of the vehicle is computed by the above-described [Equation 2].

Also, movement condition computing section 25 acquires the pulse width acquired at velocity information acquisition section 21. The movement distance of the vehicle per pulse (distance factor value), which is recorded in database 20, is also read. Then based on this distance factor value and the pulse width, the relative movement velocity of the vehicle is computed by the above-described [Equation 3].

Such processes are carried out in a period in which the vehicle velocity pulse signal can be acquired by velocity information acquisition section 21.

In a second process, though details shall be given later, movement condition computing section 25 computes the relative movement distance and the relative movement velocity based on the minimum output velocity computed at minimum output velocity computing section 24 and on the period in which the vehicle velocity pulse signal could not be acquired by velocity information acquisition section 21. The details of this computing method shall be described later.

Database 20 stores data output from processing unit 19 and also stores the distance factor value, which is the vehicle's movement distance per pulse and is set in advance by a user or maker, etc. This distance factor value may also be computed automatically by the navigation device by use of road data, etc., included in the map information. This database 20 is equipped with a distance factor value storage section 26 and a velocity information recording section 27.

Distance factor storage section 26 is arranged, for example, from a rewritable SRAM (Static Random Access Memory), etc., and stores the abovementioned distance factor value.

Velocity information recording section 27 is arranged, for example, from a rewritable SRAM, etc. This velocity information recording section 27 is equipped with a transition position recording section 28 and a pulse width recording section 29.

In transition position recording section 28 are recorded the respective state transition positions (times) of the leading edges and trailing edges of the vehicle velocity pulse signal acquired by velocity information acquisition section 21.

In pulse width recording section 29, the pulse widths A or pulse widths B, which have been computed by velocity information acquisition section 21 based on the transition positions recorded in transition position recording section 28, are recorded in association with the transition positions (times).

[Movement Condition Computing Method]

First, a movement condition computing method that is implemented in the stopping process of the vehicle shall be described with reference to FIGS. 2 to 4.

Figure 4:
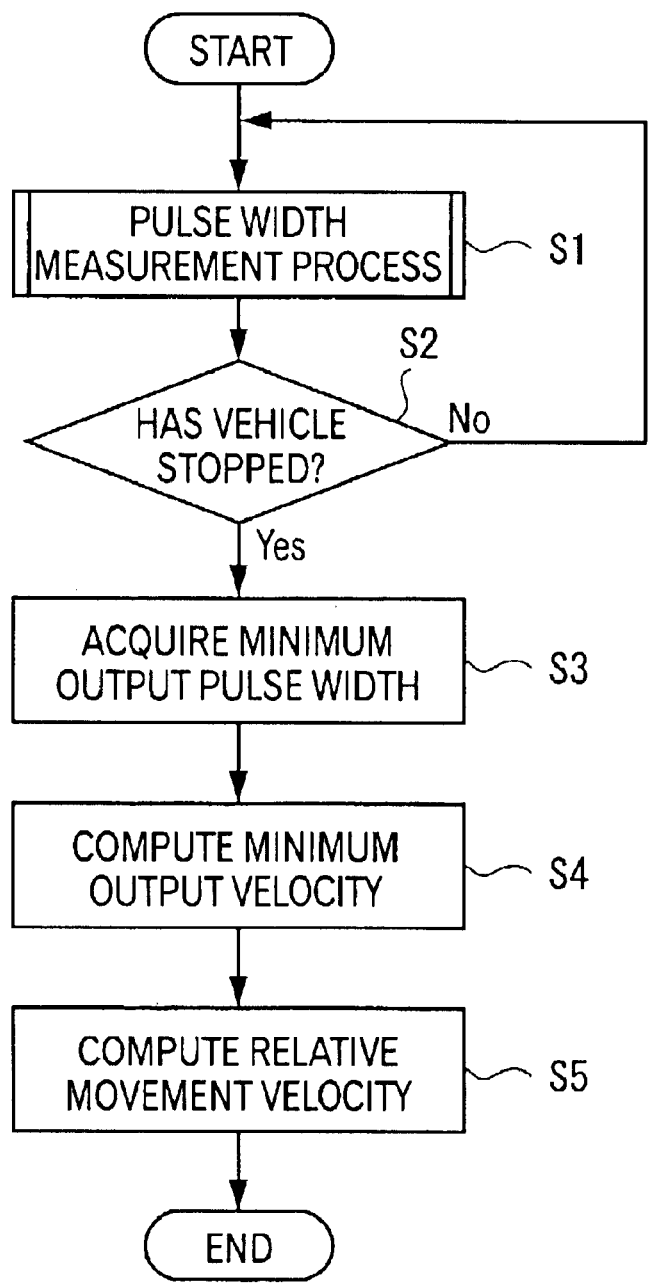
FIG. 4 is a flowchart for explaining a movement condition computing method that is implemented in a vehicle stopping process by the movement distance detection section, which is the movement condition computing device of the first embodiment of this invention.

FIG. 4 is a flowchart, illustrating the movement condition computing method that is implemented by movement distance detection section 13 in the vehicle stopping process. Velocity information acquisition section 21 acquires the vehicle velocity pulse signal detected at vehicle velocity detection circuit 10. The vehicle velocity pulse signal that has been input within a predetermined period is counted to compute the number of vehicle velocity pulses. Or the pulse widths of the input vehicle velocity pulse signal are measured (step 1).

Figure 5:
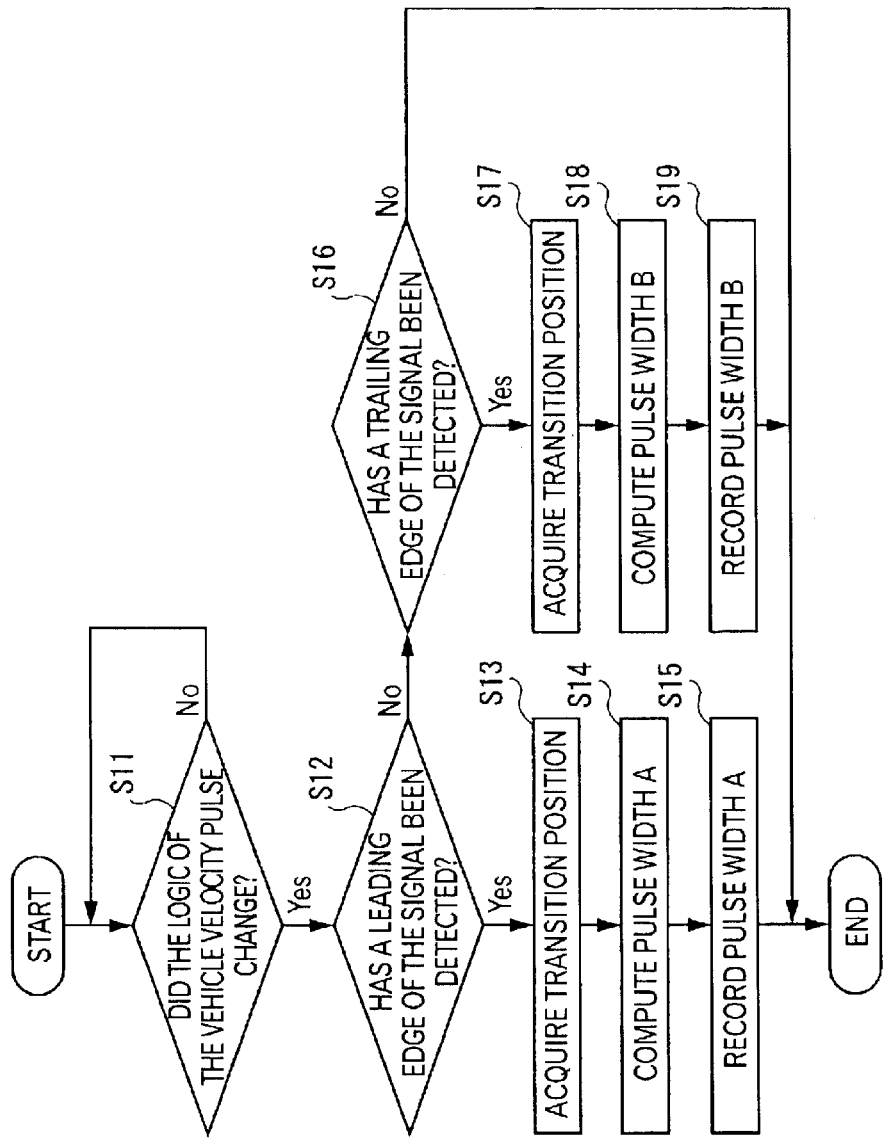
FIG. 5 is a flowchart for explaining a method of measuring the pulse widths of a vehicle velocity pulse signal as velocity information in each embodiment of this invention.

More specifically, FIG. 5 is a flowchart, illustrating the method by which the pulse widths of the vehicle velocity pulse signal are measured at velocity information acquisition section 21. This pulse width measurement method shall now be described with reference to FIG. 3 and FIG. 5.

Velocity information acquisition section 21 acquires the vehicle velocity pulse signal detected at vehicle velocity detection circuit 10 and judges whether or not the logic of this vehicle velocity pulse signal has changed (step S11). More specifically, the state transition of a leading edge or a trailing edge of the vehicle velocity pulse signal waveform is detected as shown in FIG. 3.

If in step S11, velocity information acquisition section 21 judges that the logic of the vehicle velocity pulse signal has not changed, a return to start is performed and the measurement of the pulse width is continued.

In step S11, velocity information acquisition section 21 detects that the logic of the vehicle velocity pulse signal has changed. In this case, whether or not a state transition of a leading edge of the signal has been detected is judged (step S12).

If in step S12, it is judged that the state transition of a leading edge of the signal has been detected, velocity information acquisition section 21 acquires the position (time) at which this transition occurred (step S13). This transition position is also recorded in transition position recording section 28 of database 20.

After step S13, velocity information acquisition section 21 computes pulse width A (FIG. 3) based on the acquired transition position (time) and on a transition position (time) that had been recorded in advance in transition position recording section 28 of database 20 (step S14).

The pulse width A computed in step S13 is stored in pulse width recording section 29 of database 20 (step S15). By repeating the above processes, the pulse widths A are successively recorded in pulse width recording section 29 of database 20.

On the other hand, if in step S12, it is judged that the state transition of a leading edge of the signal has not been detected, it is then judged whether or not the state transition of a trailing edge of the signal has been detected (step S16).

If in step S16, it is judged that the state transition of a trailing edge of the signal has been detected, velocity information acquisition section 21 acquires the position (time) at which this transition occurred (step S17). This transition position (time) is also recorded in transition position recording section 28 of database 20.

Velocity information acquisition section 21 computes pulse width B (FIG. 3) based on the position (time) acquired in step S17 and on a transition position (time) that had been recorded in advance in transition position recording section 28 of database 20 (step S18).

Also, the pulse width B computed in step S18 is stored in pulse width recording section 29 of database 20 (step S19). By repeating the above processes, the pulse widths B are successively recorded in pulse width recording section 29 of database 20.

Returning now to FIG. 4, while the measurement of pulse widths is being carried out at velocity information acquisition section 21 in step S1, state judgment section 23 acquires state information from state information acquisition section 22 and judges whether or not the vehicle has stopped (step S2). More specifically, state judgment section 23 acquires, from state information acquisition section 22, the state information based on the sensor signal output from acceleration sensor 12, that is, the vehicle's acceleration. State judgment section 23 judges the vehicle's stop position (time) as being the position at which the acceleration of the vehicle has stabilized at substantially 0.

If in step S2, state judgment section 23 does not judge the vehicle to be in the stop state, a return to step S1 is performed and the measurement of pulse widths by velocity information acquisition section 21 is continued.

If in step S2, state judgment section 23 judges the vehicle to be in the stop state, minimum output velocity computing section 24 acquires a minimum output pulse width from the pulse widths recorded in pulse width recording section 29 of database 20 (step S3).

Figure 6:
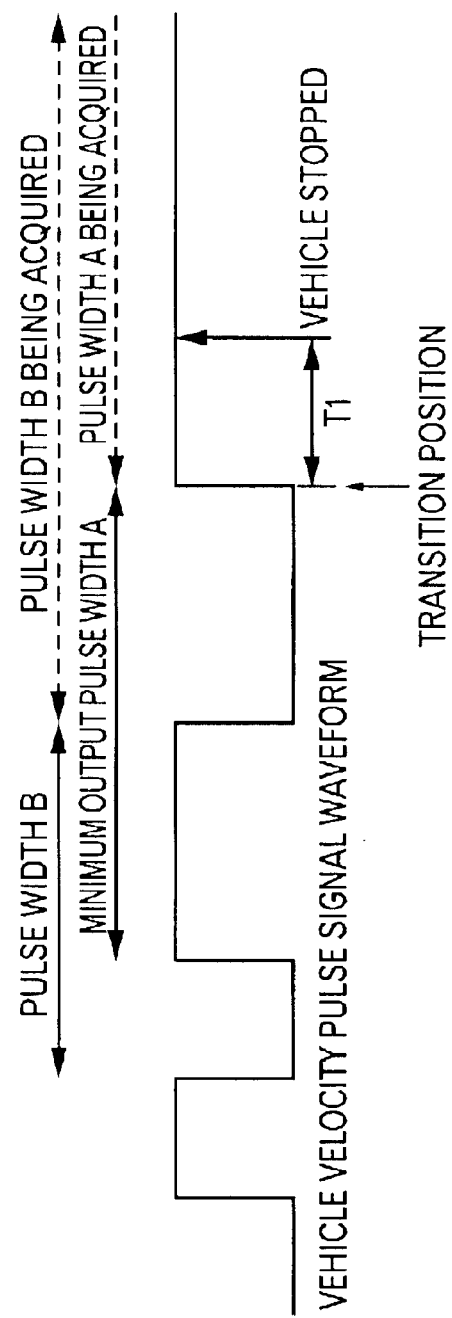
FIG. 6 is diagram, showing the waveform of the vehicle velocity pulse signal in the stopping process of a vehicle, which is a mobile body, in each embodiment of this invention.

More specifically, FIG. 6 is diagram, showing the waveform of the vehicle velocity pulse signal in the stopping process of the vehicle. When state judgment section 23 judges the vehicle to be in the stop state, minimum output velocity computing section 24 inputs a signal output from state judgment section 23. When this signal is input, minimum output velocity computing section 24 reads the pulse widths A and pulse widths B recorded in pulse width recording section 29 of database 20. Then as shown in FIG. 6, of the pulse widths A and pulse widths B that have been read, the minimum output pulse width A, which was recorded immediately prior to the stopping of the vehicle that was judged, is acquired.

After acquiring the minimum output pulse width A in step S3, minimum output velocity computing section 24 reads the distance factor value stored in distance factor storage section 26 of database 20. Then based on the acquired minimum output pulse width A and the distance factor value that was read, the minimum output velocity in the stopping process is computed by the following [Equation 4] (step S4).

Minimum output velocity=Distance factor value/minimum output pulse width A  [Equation 4]

Minimum output velocity computing section 24 also outputs the computed minimum output velocity to movement condition computing section 25.

Then after the minimum output velocity has been computed in step S4, movement condition computing section 25 acquires this minimum output velocity and computes the relative movement distance in the stopping process of the vehicle (step S5).

Figure 7:
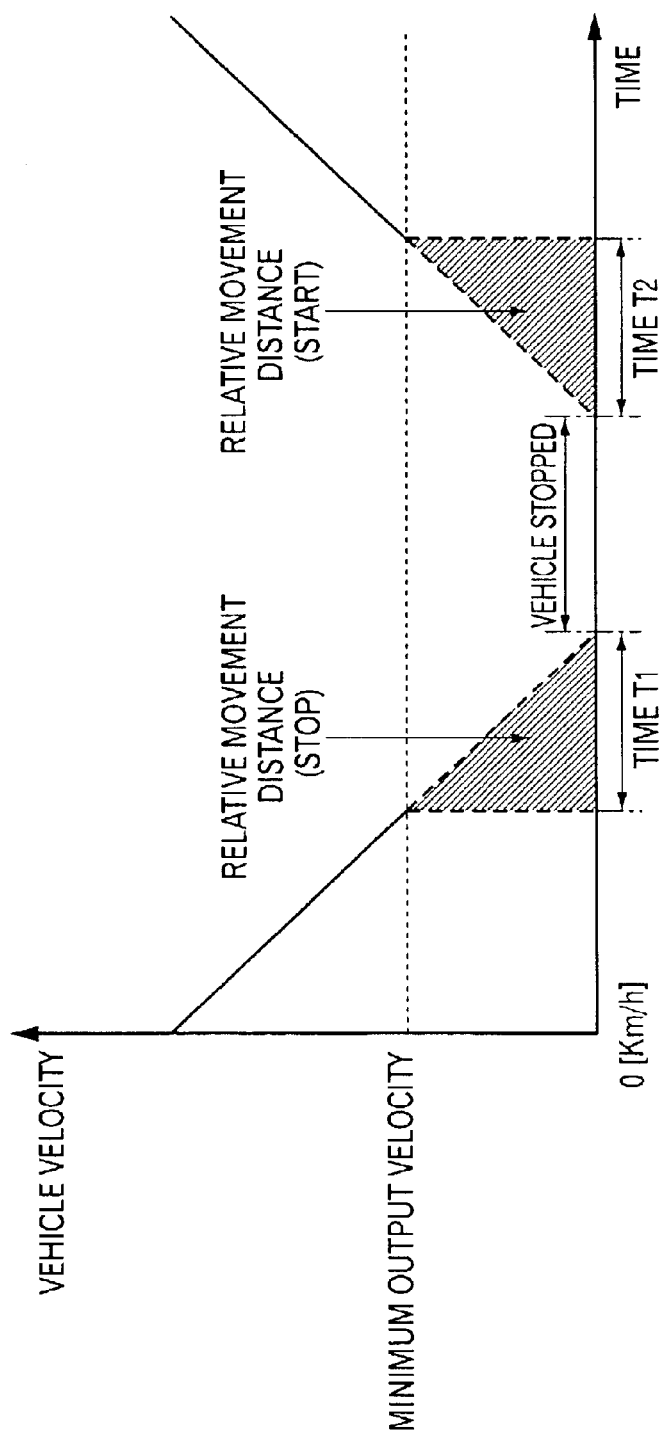
FIG. 7 is a diagram for explaining a movement condition computing method that is implemented by the movement distance detection section, which is the movement condition computing device of the first embodiment of this invention.

More specifically, FIG. 7 is a diagram for explaining the computation of the relative movement distance. Movement condition computing section 25 acquires the minimum output velocity (stopping process) that was computed by minimum output velocity computing section 24. Movement condition computing section 25 also acquires the stop position (time) that was judged by state judgment section 23. Movement condition computing section 25 also acquires the transition position (FIG. 6) related to the minimum output pulse width recorded in transition position recording section 28 of database 20. Then from the acquired stop position (time) and transition position (time), the period T1 (FIG. 6), during which the vehicle velocity pulse signal could not be acquired at velocity information acquisition section 21, is acquired. Thereafter, based on the acquired minimum output velocity and the acquired period T1, the relative movement distance in the stopping process of the vehicle is computed by the following [Equation 5].

Relative movement distance=minimum output velocity (in the stopping process)×Period T1/2         [Equation 5]

The relative movement distance (stop) computed in the above manner corresponds to the area of the black-filled triangle shown in FIG. 7. Also as shown in FIG. 7, the relative movement velocity of the vehicle is computed by a first order approximation function and based on the minimum output velocity and the stop position (time) of the vehicle.

Figure 8:
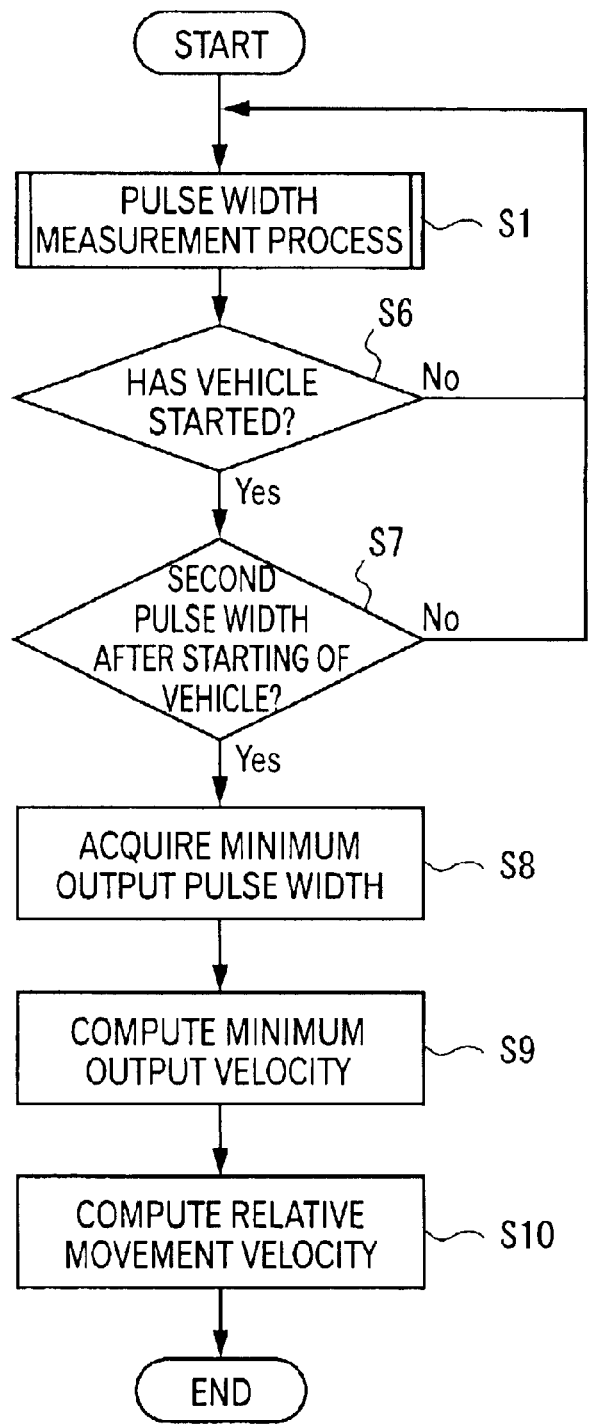
FIG. 8 is a flowchart for explaining a movement condition computing method that is implemented in a vehicle starting process by the movement distance detection section, which is the movement condition computing device of the first embodiment of this invention.

Next, the method of computing the movement condition in the starting process of the vehicle shall be described with reference to the flowchart shown in FIG. 8. In the same manner as the measurement of pulse widths in the stopping process of the vehicle, velocity information acquisition section 21 performs measurement of the pulse widths of the input vehicle velocity pulse signal (step S1). That is, velocity information acquisition section 21 performs pulse width measurement regardless of whether the vehicle is stopping or starting.

While the measurement of pulse widths is being carried out at velocity information acquisition section 21 in step S1, state judgment section 23 judges whether or not the vehicle has started (step S6). More specifically, state judgment section 23 acquires, from state information acquisition section 22, the state information based on the sensor signal output from acceleration sensor 12, that is, the vehicle's acceleration. State judgment section 23 judges the vehicle's start position (time) as being the position at which the acceleration of the vehicle increases or decreases from the position at which the acceleration was stabilized at substantially 0.

If in step S6, state judgment section 23 does not judge the vehicle to be in the start state, a return to step S1 is performed and the measurement of pulse widths by velocity information acquisition section 21 is continued.

If in step S6, state judgment section 23 judges the vehicle to be in the start state, minimum output velocity computing section 24 judges whether or not a pulse width recorded in pulse width recording section 29 of database 20 is a pulse width that is based on a leading edge or a trailing edge of the vehicle velocity pulse signal recognized at velocity information acquisition section 21 after judgment of the start state of the vehicle (step S7).

Figure 9:
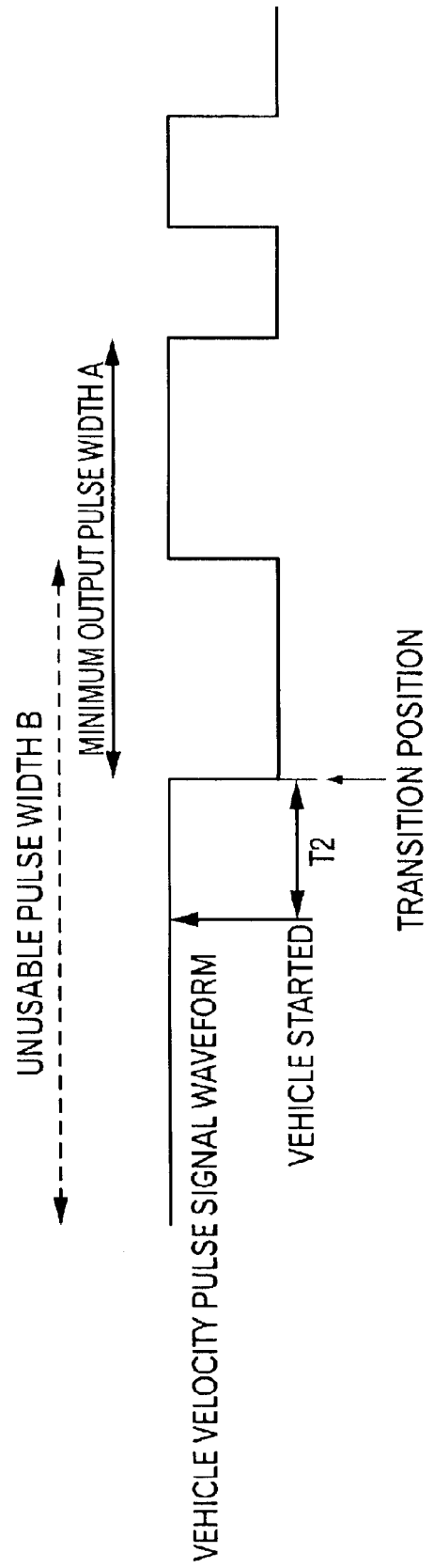
FIG. 9 is diagram, showing the waveform of the vehicle velocity pulse signal in the starting process of the vehicle, which is the mobile body, in each embodiment of this invention.

More specifically, FIG. 9 is diagram, showing the waveform of the vehicle velocity pulse signal in the starting process of the vehicle. Minimum output velocity computing section 24 inputs a signal output from state judgment section 23 and reads the pulse widths A and pulse widths B recorded in pulse width recording section 29 of database 20. Minimum output velocity computing section 24 then judges whether or not a pulse width A or pulse width B that has been read is a pulse width that is based on a leading edge or a trailing edge of the vehicle velocity pulse signal recognized at velocity information acquisition section 21 after judgment of the start state of the vehicle, that is, whether or not a pulse width is the second recorded pulse width such as shown in FIG. 9.

If the pulse width that has been read in step S7 is not the second recorded pulse width after judgment of the start state of the vehicle, a return to step S1 is performed and pulse width measurement is continued. That is, if a pulse width that is the first pulse width that was recorded after the starting of the vehicle or a pulse width that was recorded prior to the starting of the vehicle is read, pulse width measurement is continued.

If the pulse width that has been read in step S7 is the second recorded pulse width after the starting of the vehicle, this pulse width is acquired as a minimum output pulse width A (FIG. 5) (step S8). That is, pulse width measurement is continued until the second pulse width after the starting of the vehicle is recorded.

After acquiring the minimum output pulse width A in step S8, minimum output velocity computing section 24 reads the distance factor value stored in distance factor storage section 26 of database 20. Then based on the acquired minimum output pulse width A and the distance factor value that was read, the minimum output velocity (starting process) is computed by [Equation 4] in the same manner as in the case of the vehicle stopping process described above (step S9). Minimum output velocity computing section 24 also outputs the computed minimum output velocity (starting process) to movement condition computing section 25.

Then after the minimum output velocity (starting process) has been computed in step S9, movement condition computing section 25 acquires this minimum output velocity (starting process) and computes the relative movement distance in the starting process of the vehicle (step S10).

More specifically, movement condition computing section 25 acquires the computed minimum output velocity. Movement condition computing section 25 also acquires the start position (time) that was judged by state judgment section 23. Movement condition computing section 25 furthermore acquires the transition position (FIG. 9) related to the minimum output pulse width recorded in transition position recording section 28 of database 20. Then from the acquired start position (time) and transition position (time), the period T2 (FIG. 9), during which the vehicle velocity pulse signal could not be acquired at velocity information acquisition section 21, is acquired. Thereafter, based on the acquired minimum output velocity and the acquired period T2, the relative movement distance in the stopping process of the vehicle is computed by the following [Equation 6].

Relative movement distance=minimum output velocity (starting process)×Period T2/2         [Equation 6]

The relative movement distance (start) computed in the above manner corresponds to the area of the black-filled triangle shown in FIG. 7. Also, the relative movement velocity of the vehicle is computed in the same manner as in the case of the vehicle stopping process described above.

By the above processes, the relative movement distance of the vehicle in a state in which the vehicle velocity pulse signal cannot be acquired by velocity information acquisition section 21 is computed. Also, the relative movement velocity of the vehicle is computed by a first order approximation function and based on the computed minimum output velocity and the stopping or starting of the vehicle.

Before the judgment of the stopping of the vehicle or after the judgment of the starting of the vehicle is made by state judgment section 23, movement condition computing section 25 computes the relative movement distance of the vehicle by section of [Equation 2] and computes the relative movement velocity of the vehicle by section of [Equation 3].

[Effects of the First Embodiment]

With the above-described navigation device 1 of the first embodiment, velocity information acquisition section 21 computes pulse widths from the input vehicle velocity pulse signal. The computed pulse widths are recorded in velocity information recording section 27. Here, the stop or start state of the vehicle is judged by state judgment section 23. Thereafter, minimum output velocity computing section 24 reads the pulse widths recorded in velocity information recording section 27 and selects the minimum output pulse width based on the stop position (time) or start position (time) of the vehicle. Also, based on the computed minimum output pulse width and the distance factor value, minimum output velocity computing section 24 computes the minimum output velocity in a state in which the vehicle velocity pulse signal can be acquired. Movement condition computing section 25 then computes the relative movement distance of the vehicle based on the computed minimum output velocity and the vehicle's stop position (time) or start position (time) that was judged by state judgment section 23. That is, even in a state in which the vehicle velocity pulse signal cannot be acquired at velocity information acquisition section 21, the relative movement distance can be computed in an appropriate and yet simple manner.

Also by recording the pulse widths acquired at velocity information acquisition section 21 in velocity information recording section 27, the pulse widths, which have been acquired in a state in which the vehicle velocity pulse signal can be acquired at velocity information acquisition section 21, can be recorded appropriately. Minimum output velocity computing section 24 can thus compute the minimum output velocity appropriately based on these recorded pulse widths.

Furthermore, velocity information recording section 27 records the two types of pulse widths of pulse widths A, which are based on the state transitions of the leading edges of the vehicle velocity pulse signal acquired at velocity information acquisition section 21, and pulse widths B, which are based on the state transitions of the trailing edges. Here, even if a state in which the vehicle velocity pulse signal cannot be acquired at velocity information acquisition section 21 occurs at an unpredictable timing, minimum output velocity computing section 24 can select an appropriate minimum output pulse width. Minimum output velocity computing section 24 can thus compute the minimum output velocity appropriately.

In a vehicle stopping process, minimum output velocity computing section 24 selects, as the minimum output pulse width, the pulse width recorded immediately prior to the stopping of the vehicle. Minimum output velocity computing section 24 can thus compute an appropriate minimum output velocity.

Also, in a vehicle starting process, minimum output velocity computing section 24 selects, as the minimum output pulse width, the second recorded pulse width after the starting of the vehicle. Minimum output velocity computing section 24 can thus compute an appropriate minimum output velocity that does not contain error.

[Second Embodiment]

A second embodiment of this invention shall now be described.

In the description that follows, structures and members that are the same as those of the above-described first embodiment shall be provided with the same symbols and detailed descriptions thereof shall be omitted.

With the first embodiment, minimum output velocity computing section 24 reads the pulse widths recorded in pulse width recording section 29 and selects the minimum output pulse width when state judgment section 23 judges the vehicle to be in a stop state or start state. Minimum output velocity computing section 24 then computes the minimum output velocity based on this minimum output pulse width.

Meanwhile, the second embodiment differs in that minimum output velocity computing section 24 computes the minimum output velocity based on acceleration information.

Figure 10:
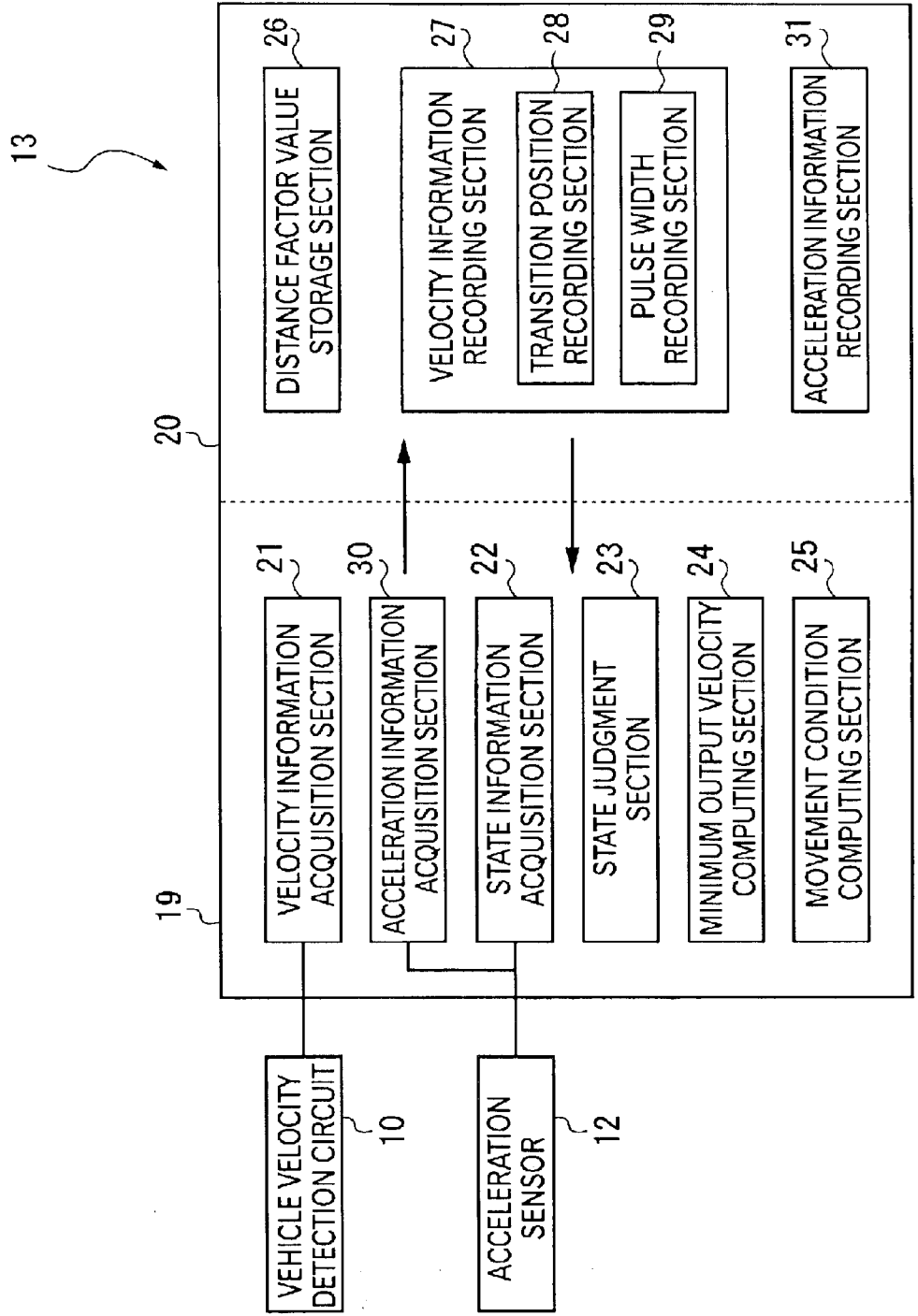
FIG. 10 is a diagram, showing the general arrangement of a movement distance detection section, which is a movement condition computing device of a second embodiment of this invention.

More specifically, FIG. 10 is a diagram, showing the general arrangement of a movement distance detection section 13, which is a movement condition computing device of the second embodiment. In FIG. 10, 13 is a movement distance detection section. This movement distance detection section 13 is equipped with a processing unit 19 and a database 20.

In addition to being equipped with the same velocity information acquisition section 21, state information acquisition section 22, state judgment section 23, minimum output velocity computing section 24, and movement condition computing section 25 as the first embodiment, processing unit 19 is also equipped with an acceleration information acquisition section 30.

Acceleration information acquisition section 30 acquires the sensor output from an acceleration sensor 12 and converts this sensor output into acceleration data of the vehicle. The acceleration data resulting from the conversion are then recorded in association with the acquisition position (time) in database 20.

Upon input of a signal from state judgment section 23, minimum output velocity computing section 24 computes the minimum output velocity immediately prior to the stopping of the vehicle or after the starting of the vehicle based on the acceleration data recorded in database 20.

Though the details shall be described below, movement condition computing section 25 computes the relative movement distance based on the minimum output velocity, computed at minimum output velocity computing section 24, and on the period in which the vehicle velocity pulse signal could not be acquired by velocity information acquisition section 21.

In addition to being equipped with the same distance factor storage section 26 and velocity information recording section 27 described for the first embodiment, database 20 is also equipped with an acceleration information recording section 31.

This acceleration information recording section 31 is arranged, for example, from a rewritable SRAM, etc. This acceleration information recording section 31 records the acceleration data, obtained by conversion at acceleration information acquisition section 30, in association with the acquisition position (time).

Figure 11:
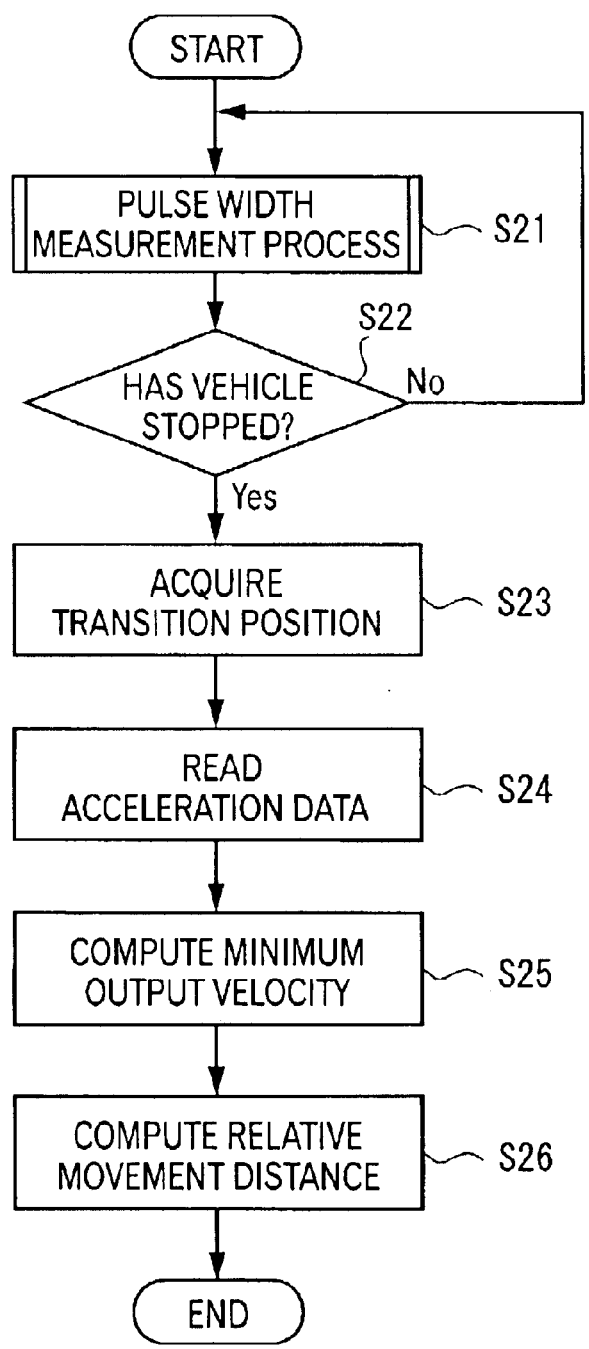
FIG. 11 is a flowchart for explaining a movement condition computing method that is implemented in the vehicle stopping process by the movement distance detection section, which is the movement condition computing device of the second embodiment of this invention.
Figure 12:
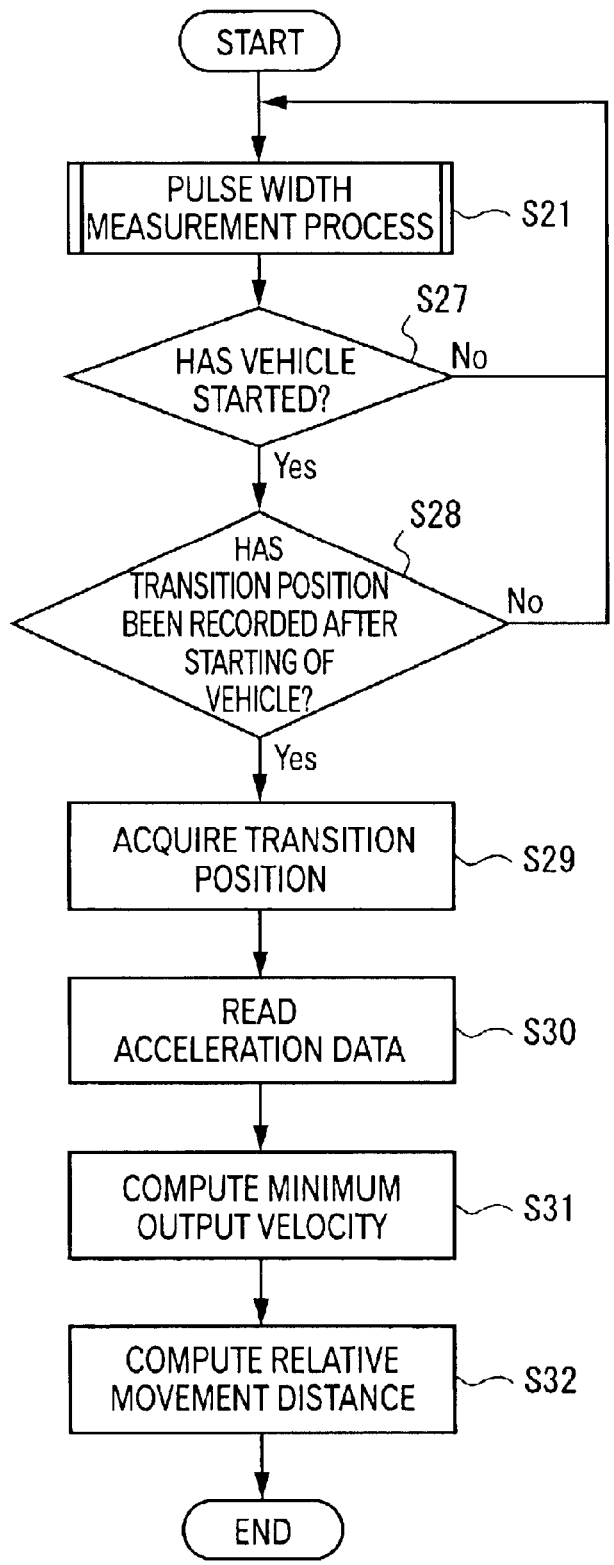
FIG. 12 is a flowchart for explaining a movement condition computing method that is implemented in the vehicle starting process by the movement distance detection section, which is the movement condition computing device of the second embodiment of this invention.

The movement condition computing method of movement distance detection section 13 shall now be described with reference to the flowcharts shown in FIGS. 11 and 12. First, the movement distance calculation method of the stopping process of the vehicle shall be described with reference to FIG. 11.

First, as in the first embodiment, velocity information acquisition section 21 performs measurement of pulse widths (step S21). Here, in parallel to the pulse width measurement by velocity information acquisition section 21, acceleration data are acquired by acceleration information acquisition section 30. Also, the acquired acceleration data are recorded in acceleration information recording section 31.

While pulse width measurement is being carried out in step S21, whether or not the vehicle has stopped is judged by state judgment section 23 in the same manner as in the first embodiment (step S22).

If in step S22, state judgment section 23 judges that the vehicle is not in the stop state, a return to step S21 is performed and pulse width measurement by velocity information acquisition section 21 is continued.

If in step S22, state judgment section 23 judges that the vehicle is in the stop state, minimum output velocity computing section 24 acquires, from among the transition positions recorded in transition position recording section 28 of database 20, the transition position recorded immediately prior to the stopping of the vehicle (step S23).

Then after this step S23, minimum output velocity computing section 24 reads, from among the acceleration data recorded in acceleration information recording section 31, the acceleration data corresponding to the transition position acquired in step S23 (step S24).

Figure 13:
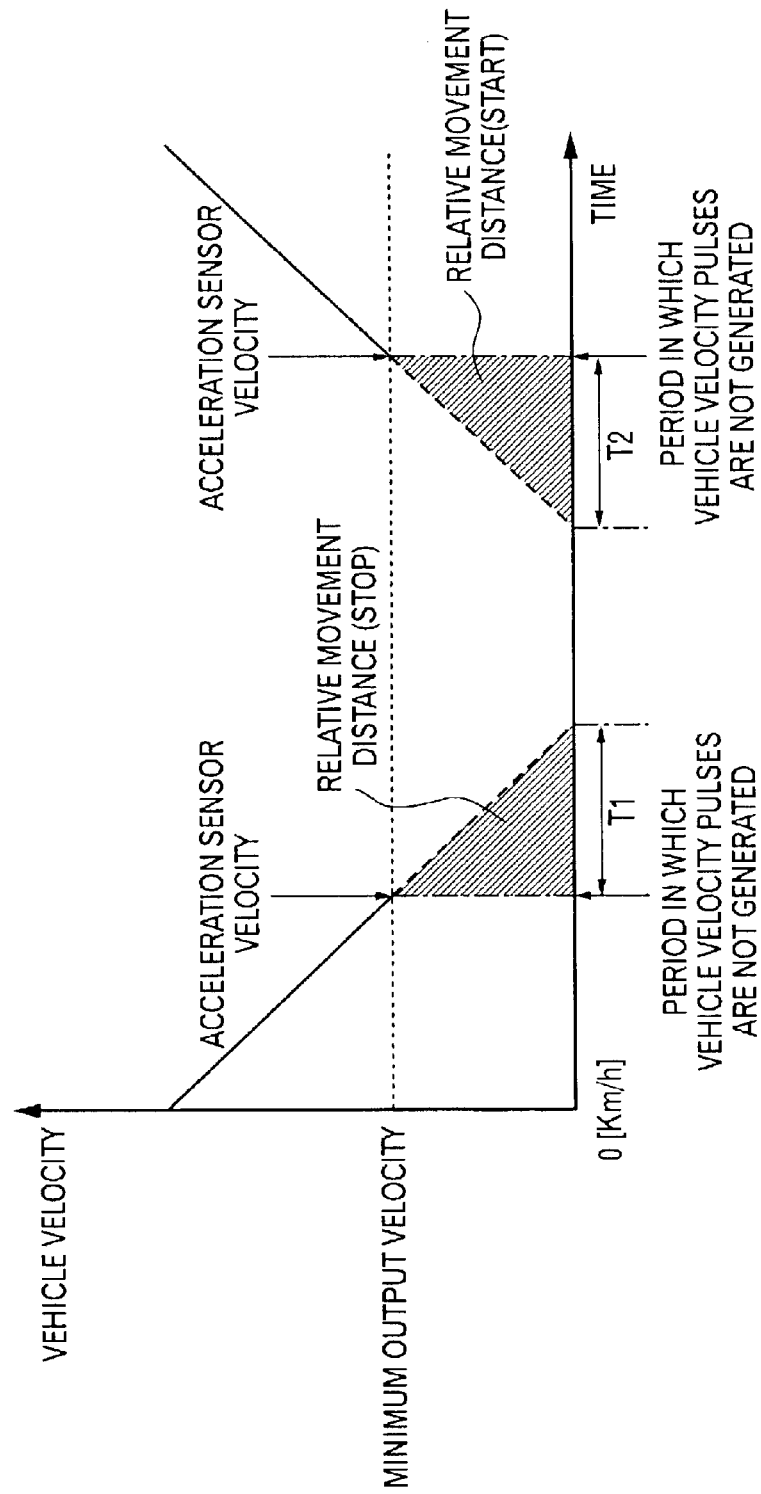
FIG. 13 is a diagram for explaining a movement condition computing method implemented by the movement distance detection section, which is the movement condition computing device of the second embodiment of this invention.

Furthermore, after this step S24, minimum output velocity computing section 24 converts the acquired acceleration data into velocity data and computes the acceleration sensor velocity as the minimum output velocity as shown in FIG. 13 (step S25).

Then after this step S25, movement condition computing section 25 acquires the acceleration sensor velocity computed in step S25. Movement condition computing section 25 also acquires, from among the transition positions recorded in transition position recording section 28 of database 20, the transition position (time) at which the logic of the vehicle velocity pulse signal changed immediately prior to the stopping of the vehicle. Furthermore, the stop position (time) of the vehicle that was judged by state judgment section 23 is acquired. Then based on the acquired transition position (time) and the vehicle stop position (time), movement condition computing section 25 computes the period T1 (FIG. 13) in which the vehicle velocity pulse signal could not be acquired at velocity information acquisition section 21. Movement condition computing section 25 then computes the relative movement distance in the vehicle stopping process based on the acceleration sensor velocity and period T1 and by section of the following [Equation 7] (step S26).

$$\text{Relative movement distance (stop)} = \text{Acceleration sensor velocity} \times \text{Period } T1/2 \quad \text{[Equation 7]}$$

The relative movement distance (stop) that is calculated in the above manner corresponds to the area of the black-filled triangle shown in FIG. 13. The computing of the relative movement velocity is carried out in the same manner as in the first embodiment.

Next, the method of computing the movement condition in the vehicle starting process shall be described with reference to FIG. 12. As in the pulse width measurement in the vehicle stopping process, velocity information acquisition section 21 carries out measurement of pulse widths (step S21). That is regardless of the stopping or starting of the vehicle, velocity information acquisition section 21 carries out pulse width measurement. Acquisition of acceleration data by acceleration information acquisition section 30 is carried out in parallel to pulse width measurement by velocity information acquisition section 21 in this case as well. The acquired acceleration data are recorded in acceleration information recording section 31.

While pulse width measurement at velocity information acquisition section 21 is being carried out in step S21, state judgment section 23 judges whether or not the vehicle has started (step S27).

If in step S27, state judgment section 23 does not judge the vehicle to be in the start state, a return to step S21 is performed.

If in step S27, state judgment section 23 judges the vehicle to be in the start state, minimum output velocity computing section 24 reads the transition positions recorded in transition position recording section 28 of database 20 and then judges whether or not a transition position was recorded after the starting of the vehicle (step S28).

If in step S28, it is judged that a transition position has not been recorded after the starting of the vehicle, a return to step S21 is performed again.

If in step S28, it is judged that a transition position was recorded after the starting of the vehicle, minimum output velocity computing section 24 acquires the transition position recorded immediately after the starting of the vehicle (step S29).

Then after this step S29, minimum output velocity computing section 24 reads, from among the acceleration data recorded in acceleration information recording section 31, the acceleration data corresponding to the transition position acquired in step S29 (step S30).

Furthermore, after this step S30, minimum output velocity computing section 24 converts the acquired acceleration data into velocity data and computes the acceleration sensor velocity (FIG. 13) as the minimum output velocity (step S31).

Then after this step S31, movement condition computing section 25 acquires the acceleration sensor velocity that was computed in step S31 and also acquires, from among the transition positions recorded in transition position recording section 28, the transition position that was recorded immediately after the starting of the vehicle. Furthermore, based on the vehicle start position judged by state judgment section 23 and the acquired transition position, movement condition computing section 25 computes the period T2 (FIG. 13) in which the vehicle velocity pulse signal cannot be acquired at velocity information acquisition section 21. Then based on the acceleration sensor velocity and the period T2, movement condition computing section 25 computes the relative movement distance in the vehicle starting process by the following [Equation 8] (step S32).

$$\text{Relative movement distance (start)} = \text{Acceleration sensor velocity} \times \text{Period } T2/2 \quad \text{[Equation 8]}$$

The relative movement distance (start) computed in the above manner corresponds to the area of the black-filled triangle shown in FIG. 13. Also, the relative movement velocity is computed in the same manner as in the first embodiment.

The relative movement distances or relative movement velocities prior to state judgment section 23 judging the vehicle to be stopped and after state judgment section 23 judging the vehicle to have started are computed in the same manner as in the first embodiment.

[Effects of the Second Embodiment]

With the above-described navigation device 1 of the second embodiment, acceleration information acquisition section 30 converts the sensor output from the acceleration sensor into acceleration data. The acceleration data are recorded in acceleration information recording section 31. Minimum output velocity computing section 24 acquires the transition position corresponding to a state in which velocity information acquisition section 21 cannot acquire the vehicle velocity pulse signal. The acceleration data corresponding to this transition position is read and converted into velocity data. The minimum output velocity computing section can compute an appropriate minimum output velocity based on the velocity data resulting from the conversion. Thus by using this minimum output velocity, movement condition computing section 25 can compute the relative movement distance or relative movement velocity of the vehicle appropriately even in a state in which velocity information acquisition section 21 cannot acquire the vehicle velocity pulse signal during travel of the vehicle.

[Third Embodiment]

A third embodiment of this invention shall now be described.

In the following description, structures and members that are the same as those of the above-described first embodiment shall be provided with the same symbols and detailed descriptions thereof shall be omitted.

With the first embodiment, movement condition computing section 25 uses an approximate computing equation to compute the relative movement distance based on the minimum output velocity in a state in which the vehicle velocity pulse signal can be acquired by velocity information acquisition section 21 and on the stop position (time) or start position (time) judged by state judgment section 23.

Meanwhile, the third embodiment differs in that movement condition computing section 25 converts acceleration information into velocity information in a state in which velocity information acquisition section 21 cannot acquire the vehicle velocity pulse signal and integrates the computed velocity information to compute the relative movement distance.

Figure 14:
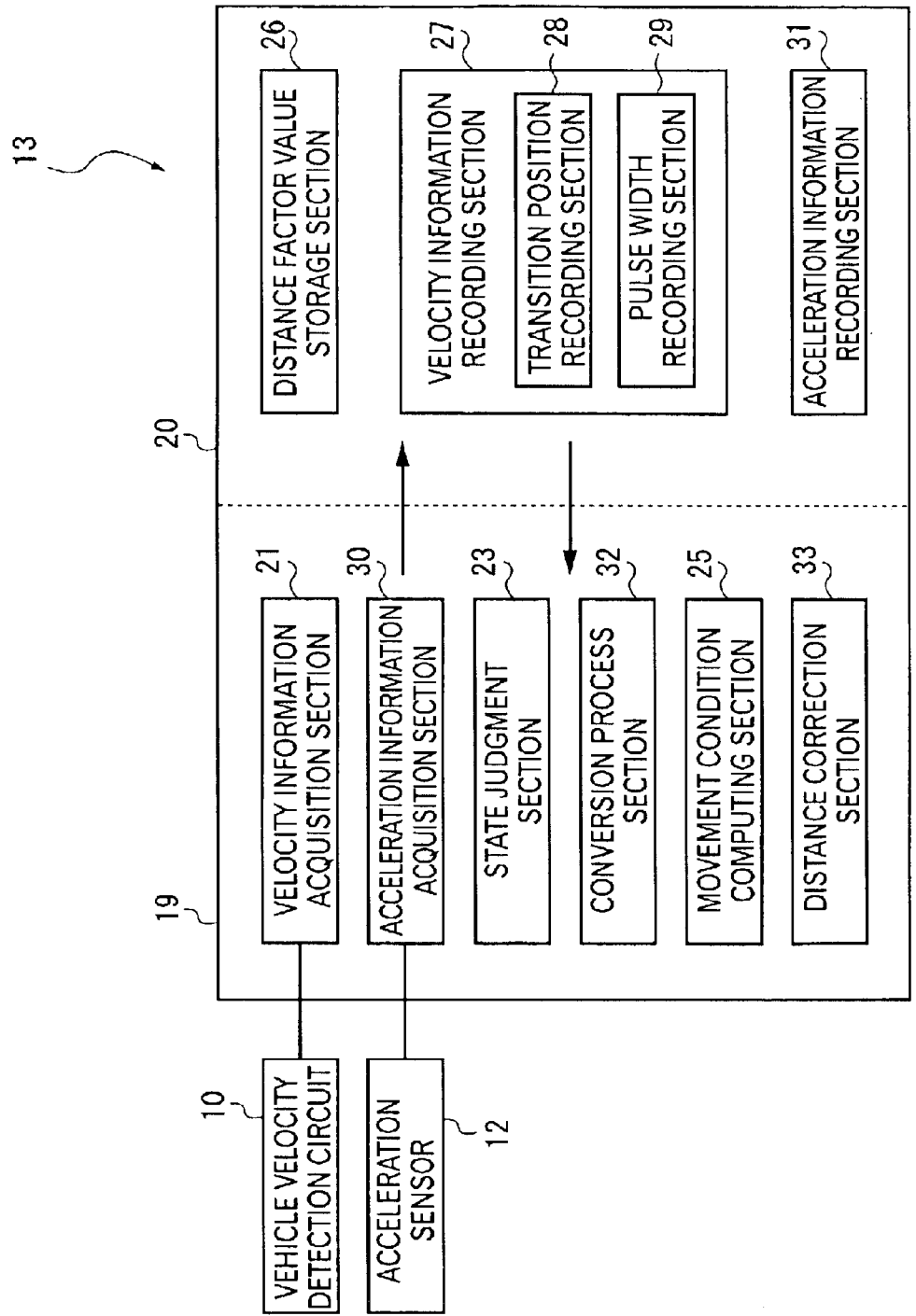
FIG. 14 is a diagram, showing the general arrangement of a movement distance detection section, which is a movement condition computing device of a third embodiment of this invention.

More specifically, FIG. 14 is a diagram, showing the general arrangement of a movement distance detection section 13, which is a movement condition computing device of the third embodiment. In FIG. 14, 13 is the movement distance detection section, and this movement distance detection section 13 is equipped with a processing unit 19 and a database 20.

In addition to being equipped with the same velocity information acquisition section 21, state judgment section 23, and movement condition computing section 25 as the first embodiment, processing unit 19 is also equipped with an acceleration information acquisition section 30, a conversion process section 32, and a distance correction section 33.

Acceleration information acquisition section 30 acquires the sensor signal output from an acceleration sensor and converts this input sensor signal into acceleration data. The acceleration data resulting from the conversion are recorded in database 20. The converted acceleration data are also output to state judgment section 23 and conversion process section 32.

Based on the acceleration data output from acceleration information acquisition section 30, state judgment section 23 judges the stop or start state of the vehicle. Upon judging the vehicle to be in the stop or start state, state judgment section 23 outputs a signal to conversion process section 32.

Conversion process section 32 reads the acceleration data recorded in an acceleration information recording section 31 and coverts the read acceleration data into velocity data. The velocity data resulting from the conversion are output to movement condition computing section 25.

Movement condition computing section 25 integrates the velocity data output from conversion processing section 32 and computes the relative movement distance of the vehicle. The computed relative movement distance is output to distance correction section 33.

Distance correction section 33 corrects the relative movement distance output from movement condition computing section 25. If there is an error in the acceleration data acquired at acceleration information acquisition section 30, distance correction section 33 computes a relative movement distance correction value based on the error value and then corrects the relative movement distance by subtracting the correction value from the relative movement distance.

In addition to being equipped with the same distance factor value storage section 26 and velocity information recording section 27 as that described for the first embodiment, database 20 is also equipped with acceleration information recording section 31.

Acceleration information recording section 31 is arranged, for example, from a rewritable SRAM, etc.

This acceleration information recording section 31 records the acceleration data acquired at acceleration information acquisition section 30.

Figure 15:
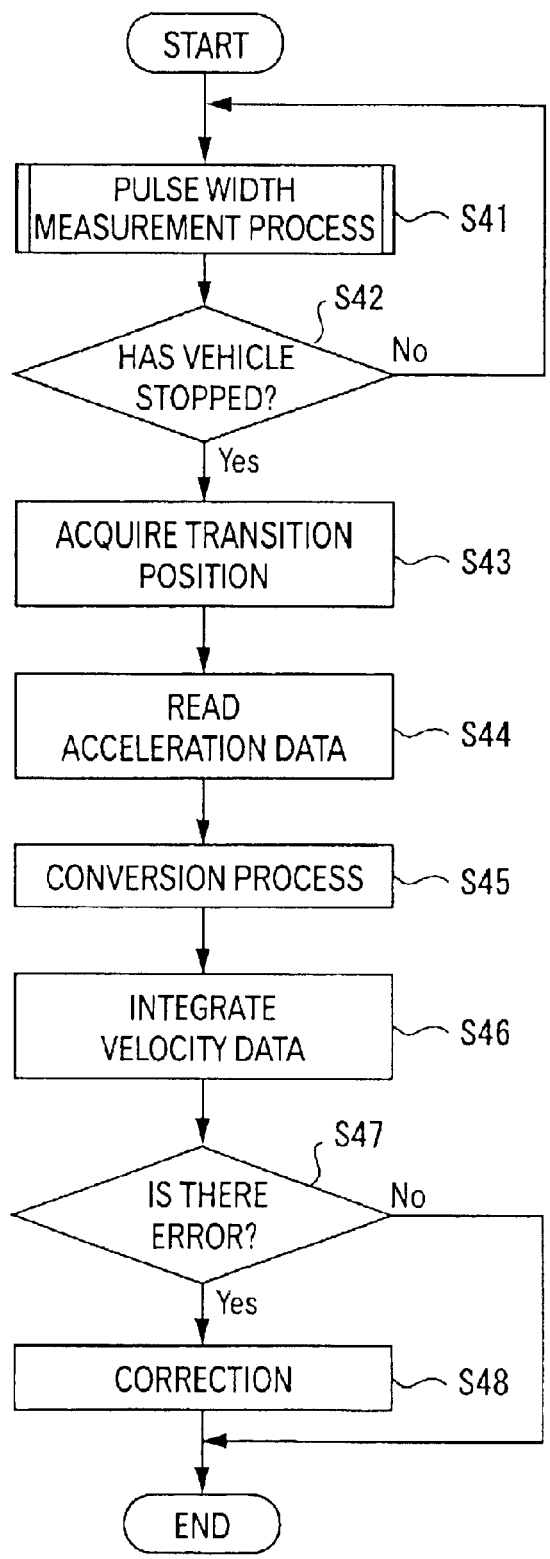
FIG. 15 is a flowchart for explaining a movement condition computing method that is implemented in the vehicle stopping process by the movement distance detection section, which is the movement condition computing device of the third embodiment of this invention.
Figure 16:
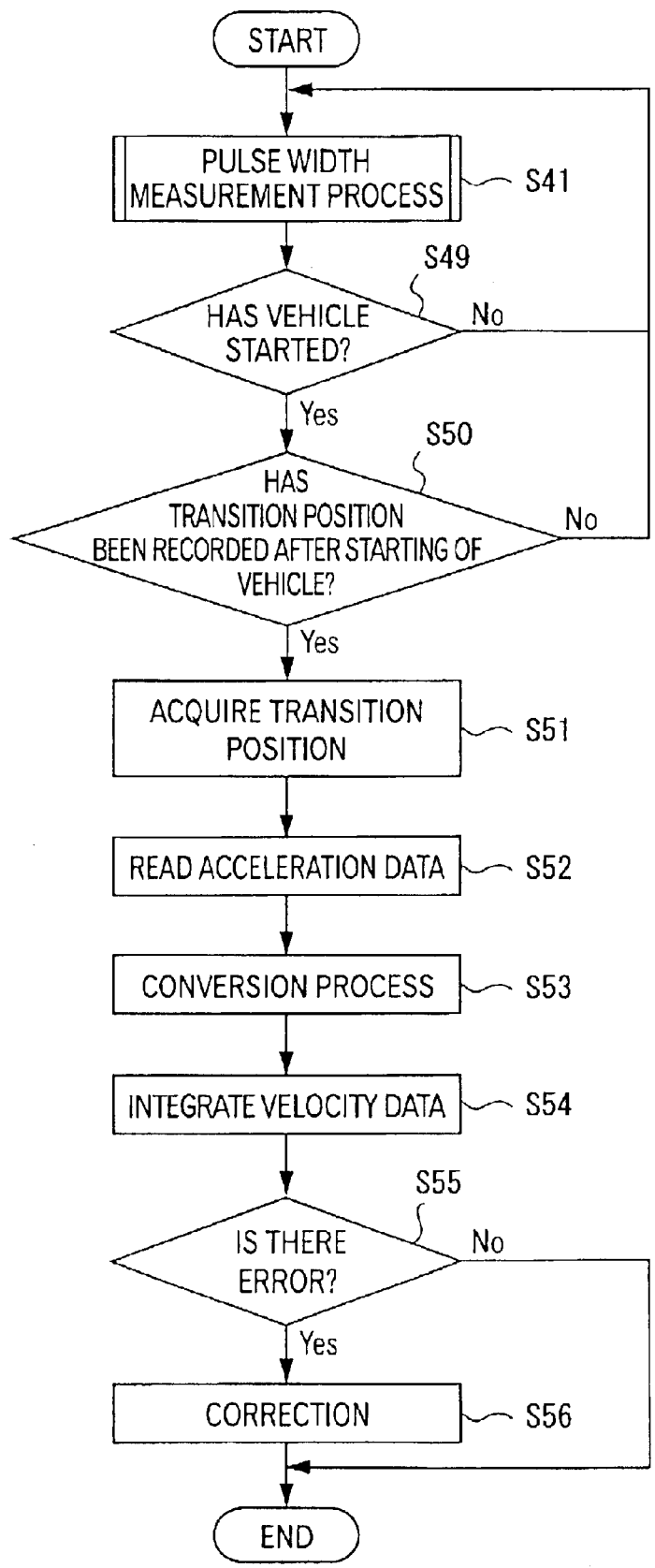
FIG. 16 is a flowchart for explaining a movement condition computing method that is implemented in the vehicle starting process by the movement distance detection section, which is the movement condition computing device of the first embodiment of this invention.

The movement condition computing method of movement distance detection section 13 shall now be described with reference to the flowcharts shown in FIGS. 15 and 16. First, the movement condition computing method for the stopping process of the vehicle shall be described with reference to FIG. 15.

First, as in the first embodiment, velocity information acquisition section 21 performs measurement of pulse widths (step S41). Here, in parallel to the pulse width measurement by velocity information acquisition section 21, acceleration data are acquired by acceleration information acquisition section 30. Also, the acquired acceleration data are recorded in acceleration information recording section 31.

While pulse width measurement is being carried out in step S41, state judgment section 23 acquires acceleration data from acceleration information acquisition section 30 and judges whether or not the vehicle is in the stop state (step S42). More specifically, state judgment section 23 reads the acceleration data values successively and judges the state, in which this value decreases to close to 0 and stabilizes, as being the stop state of the vehicle.

If in step S42, state judgment section 23 judges that the vehicle is not in the stop state, a return to step S41 is performed.

If in step S42, it is judged that the vehicle is in the stop state, conversion process section 32 inputs a signal from state judgment section 23. Thereafter, conversion process section 32 reads the transition position recorded in transition position recording section 28 of database 20 and acquires the transition position recorded immediately prior to the stopping of the vehicle (step S43).

Also after step S43, conversion process section 32 successively reads the acceleration data recorded in acceleration information recording section 31 in a period T1 (FIG. 17), from the acquired transition position to the vehicle stop position (step S44).

Then after step S44, conversion process section 32 converts the acquired acceleration data into velocity data successively (step S45). The velocity data resulting from the conversion are successively output to movement condition computing section 25.

After step S45, movement condition computing section 25 integrates the acquired velocity data to compute the relative movement distance in the vehicle stopping process (step S46). The relative movement distance that has thus been computed is output to distance correction section 33.

Figure 17:
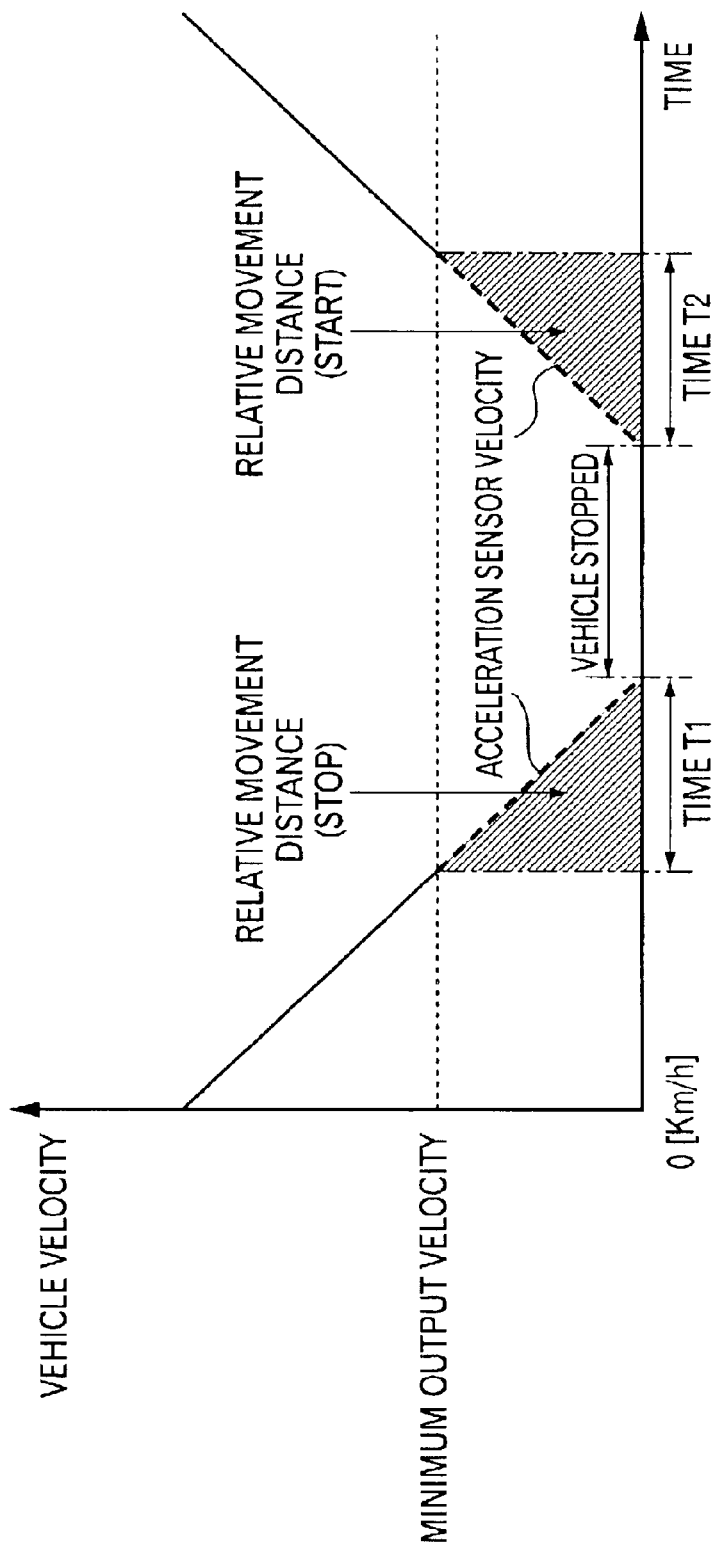
FIG. 17 is a diagram for explaining a movement condition computing method implemented by the movement distance detection section, which is the movement condition computing device of the third embodiment of this invention.

More specifically, if the velocity data values resulting from conversion at conversion process section 32 exhibit a first-order-function-like straight line as shown in FIG. 17, the area of the black-filled triangle corresponds to the relative movement distance (stop). For the vehicle stopping process, there may also be a case where the acceleration varies in a manner such that the velocity data values resulting from conversion at conversion process section 32 do not exhibit a first-order-function-like straight line. Even in such a case, an appropriate relative movement distance is computed by integrating the velocity data.

Distance correction section 33 acquires acceleration data when it has been judged at state judgment section 23 that the vehicle is in the stop state and then judges whether or not error is contained in the acceleration data values (step S47).

If it is judged in step S47 that error is not contained, correction is not performed on the relative movement distance (stop) that was computed in step S46.

If in step S47, it is judged that error is contained, distance correction section 33 performs correction of the relative movement distance that was computed in step S46 (step S48).

Figure 18A:
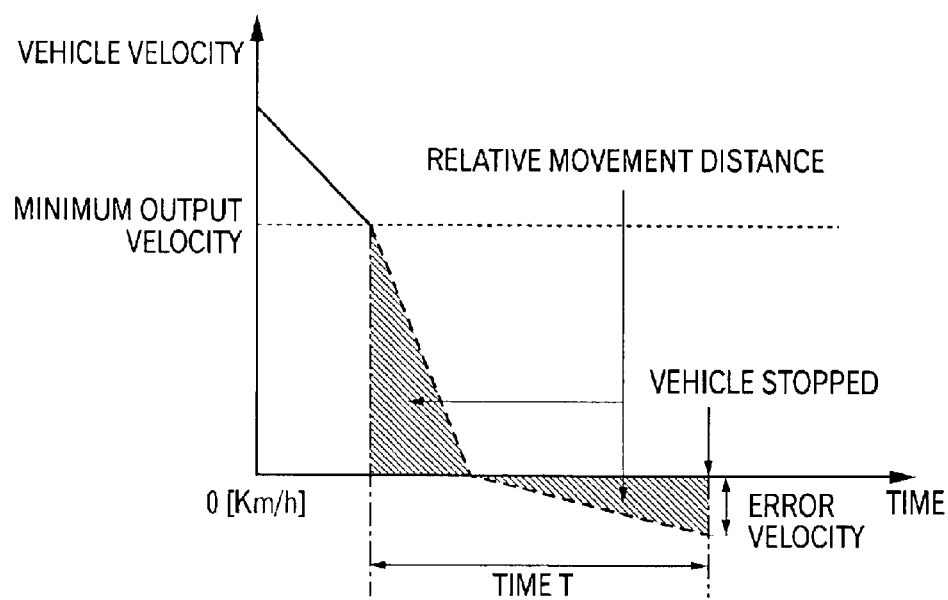
FIG. 18 is a diagram for explaining a method of relative movement distance correction by a distance correction section of the third embodiment of this invention.

More specifically, FIG. 18 is a diagram for explaining the method of correcting the relative movement distance.

Error may occur in acceleration sensor 12 due to temperature characteristics, vibration of the vehicle, etc., and the acceleration data acquired at acceleration information acquisition section 30 may thus contain error. In such a case, state judgment section 23 judges the position at which the acceleration data values decrease and stabilize as the vehicle stop position. Thus as shown in FIG. 18, despite the vehicle being at the stop position, the velocity at the stop state may be erroneous.

In such a state, movement condition computing section 27 integrates the velocity data during the period T from the vehicle stop position to the position at which the vehicle velocity pulse signal cannot be acquired at velocity information acquisition section 21. That is, movement condition computing section 27 computes the area of the black-filled triangles shown in FIG. 18(A) as the relative movement distance. The computed relative movement distance thus contains error.

Figure 18B:
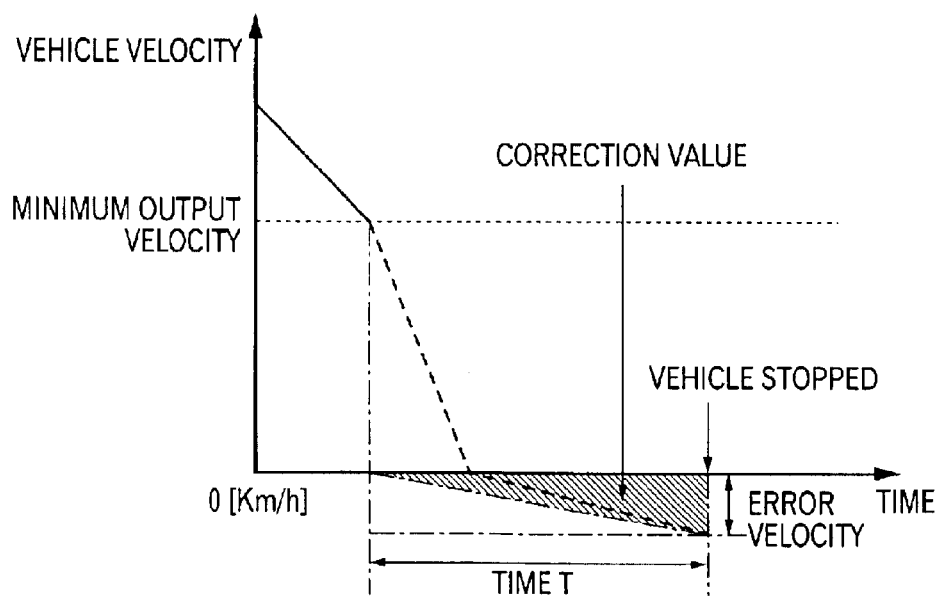

It is assumed that the erroneous velocity is contained in the velocity data even as the velocity data are integrated within the period T as shown in FIG. 18(B) and, using the error velocity and period T, the relative movement distance correction value is computed by the following [Equation 9].

$$\text{Correction value} = \text{Error velocity} \times Y/2 \quad \text{[Equation 9]}$$

Then based on the relative movement distance and this correction value, the relative movement distance is corrected by the following [Equation 10].

$$\text{Corrected movement distance} = \text{Relative movement distance} - \text{Correction value} \quad \text{[Equation 10]}$$

Next, the method of computing the movement condition in the vehicle starting process shall be described with reference to FIG. 16. As in the pulse width measurement in the vehicle stopping process, velocity information acquisition section 21 carries out measurement of pulse widths (step S41). That is regardless of the stopping or starting of the vehicle, velocity information acquisition section 21 carries out pulse width measurement. Here, acquisition of acceleration data by acceleration information acquisition section 30 is carried out in parallel to pulse width measurement by velocity information acquisition section 21. The acquired acceleration data are recorded in acceleration information recording section 31.

While pulse width measurement at velocity information acquisition section 21 is being carried out in step S41, state judgment section 23 acquires acceleration data from acceleration information acquisition section 30 and judges whether or not the vehicle has started (step S49). More specifically, state judgment section 23 reads the acceleration data values successively and judges the state, in which these values increase from the state in which the values are stable at close to 0, as being the start state of the vehicle.

If in step S49, state judgment section 23 does not judge the vehicle to be in the start state, a return to step S41 is performed.

If in step S49, state judgment section 23 judges the vehicle to be in the start state, conversion process section 32 inputs the signal from state judgment section 23. Thereafter, conversion process section 32 reads the transition positions recorded in transition position recording section 28 of database 20 and then judges whether or not a transition position was recorded after the starting of the vehicle (step S50).

If in step S50, it is judged that a transition position has not been recorded after the starting of the vehicle, a return to step S41 is performed again.

If in step S50, it is judged that a transition position was recorded after the starting of the vehicle, conversion process section 32 acquires the transition position recorded immediately after the starting of the vehicle (step S51).

Then after this step S51, conversion process section 32 successively reads the acceleration data recorded in acceleration information recording section 31 during a period T2 (FIG. 17), from the acquired transition position to the vehicle start position (step S52).

Then after this step S52, conversion process section 32 converts the acquired acceleration data into velocity data successively as was done in step S45 (step S53). The converted velocity data are successively output to movement condition computing section 25.

After step S53, movement condition computing section 25 integrates the acquired velocity data successively to compute the relative movement distance in the vehicle starting process (step S54). The relative movement distance that has thus been computed is output to distance correction section 33.

Distance correction section 33 acquires acceleration data when it has been judged at state judgment section 23 that the vehicle is in the start state and then judges whether or not error is contained in the acceleration data values (step S55).

If it is judged in step S55 that error is not contained, correction is not performed on the relative movement distance that was computed in step S54.

If in step S55, it is judged that error is contained, correction is performed on the relative movement distance that was computed in step S54. More specifically, the error velocity (FIG. 16) at the vehicle's start position is acquired. Then based on this error velocity and the period T, from the position at which velocity information acquisition section 21 cannot acquire the vehicle velocity pulse signal to the vehicle's start position, the correction value is computed by the above-described [Equation 9]. Also based on this correction value and the relative movement distance computed in step S54, the relative movement distance is corrected by the above-described [Equation 10] (step S56).

By the processes described above, the relative movement distance of the vehicle in a state in which velocity information acquisition section 21 cannot acquire the vehicle velocity pulse signal is computed.

The relative movement distances or relative movement velocities prior to the state judgment section judging the vehicle to be stopped and after the state judgment section judging the vehicle to have started are computed in the same manner as in the first embodiment. Also, the relative movement velocity is computed based on the computed minimum output velocity and the time at which the vehicle has stopped or started and using a first-order approximation function.

[Effects of the Third Embodiment]

With the above-described navigation device 1 of the third embodiment, acceleration information acquisition section 30 acquires acceleration data. The acceleration data acquired at acceleration information acquisition section 30 are recorded in acceleration information recording section 31. The acceleration data acquired at acceleration information acquisition section 30 are furthermore output to state judgment section 23. Based on the acquired acceleration data, state judgment section 23 can judge the stop or start state of the vehicle. Thereafter, conversion process section 32 successively converts the acceleration data, recorded in acceleration information recording section 31 from the vehicle stop position or start position to the position at which the vehicle velocity pulse signal can be acquired by velocity information acquisition section 21, into velocity data. Movement condition computing section 25 can then compute the relative movement distance by successively integrating the velocity data. The relative movement distance can thus be computed appropriately even for a period in which velocity information acquisition section 21 cannot acquire the vehicle velocity pulse signal during travel of the vehicle.

By successively integrating the velocity data, movement condition computing section 27 can compute the vehicle's relative movement distance more accurately even during a period in which velocity information acquisition section 21 cannot acquire the vehicle velocity pulse signal during travel of the vehicle.

Distance correction section 33 judges whether or not the relative movement distance needs to be corrected based on the acceleration data during the judgment of the stop or start state of the vehicle at state judgment section 23. If there is an error in the acceleration data, a relative movement distance correction value is computed based on the error velocity in the stop or start state of the vehicle. The relative movement distance is then corrected by subtracting the relative movement distance correction value. The vehicle's relative movement distance can thereby be computed even more accurately even during a period in which velocity information acquisition section 21 cannot acquire the vehicle velocity pulse signal during travel of the vehicle.

[Modifications of the Embodiments]

Though preferable embodiments of this invention were described above, this invention is not limited to these embodiments and various modifications and design changes are possible within a scope that does not fall outside the gist of this invention.

Though with each of the above-described embodiments, the sensor output from an acceleration sensor is used as the state information that indicates the stop or start state of the vehicle, this invention is not limited thereto and a gyro or other sensor may be used instead.

Though with each of the above-described embodiments, the stop or start state of the vehicle is judged at the state judgment section, this invention is not limited thereto, and an arrangement is also possible wherein the stop or start state of the vehicle is judged when the pulse width that is being acquired at the velocity information acquisition section is found by a timer, etc., to have elapsed for a predetermined period.

Though with each of the above-described embodiments, an arrangement is made to compute two types of pulse widths, that is, the pulse width based on the leading edge of the signal and the pulse width based on the trailing edge of the signal as pulse widths of the vehicle velocity pulse signal acquired at the velocity information acquisition section, this invention is not limited thereto, and an arrangement is also possible wherein just one of the two types of pulse width is computed.

Though with each of the above-described embodiments, a rectangular wave is used as the vehicle velocity pulse signal acquired at the velocity information acquisition section, this invention is not limited thereto, and a sine wave, triangular wave, sawtooth wave, etc., may be used instead.

Though with the first embodiment or second embodiment described above, the computed relative movement distance is not corrected, this invention is not limited thereto, and these embodiments may be equipped with a distance correction section or other correction function as in the above-described third embodiment.

Though with the third embodiment described above, the relative movement distance or the relative movement velocity is computed based on the pulse width or number of vehicle velocity pulses acquired by the velocity information acquisition section when the velocity information acquisition section can acquire the vehicle velocity pulse signal, this invention is not limited thereto. That is, an arrangement is also possible wherein the relative movement distance or the relative movement velocity are computed based on the acceleration information acquired at the acceleration information acquisition section.

What is claimed is:

1. A movement condition computing device comprising:
   a velocity information acquisition section, acquiring velocity information concerning the velocity of a mobile body;
   a minimum output velocity computing section, computing, when said velocity information acquisition section cannot acquire said velocity information during movement of said mobile body, a minimum output velocity of a point in time at which said velocity information acquisition section could acquire said velocity information;
   a state information acquisition section, acquiring state information on at least one of start and stop states of said mobile body; and
   a movement condition computing section, computing at least one of movement distance information and movement velocity information on said mobile body based on the minimum output velocity computed at said minimum output velocity computing section and the state information acquired at said state information acquisition section.

2. The movement condition computing device as set forth in claim 1, further comprising:
   a velocity information recording section, recording the velocity information acquired at said velocity information acquisition section; and
   a state judgment section, judging at least one of start and stop states of the mobile body from the state information acquired at the state information acquisition section; and
   wherein the minimum output velocity computing section computes the minimum output velocity based on the velocity information recorded in said velocity information recording section upon recognizing that at least one of start and stop states of said mobile body has been judged at said state judgment section.

3. The movement condition computing device as set forth in claim 2, wherein based on a pulse signal from a velocity information output section that outputs the pulse signal, the velocity information acquisition section acquires, as the velocity information, the two types of periods of periods based on leading edges of said pulse signal and periods based on trailing edges of said pulse signal;

the velocity information recording section records the two types of periods acquired at said velocity information acquisition section; and upon recognizing that at least one of start and stop states of said mobile body has been judged at the state judgment section, the minimum output velocity computing section computes the minimum output velocity based on the periods based on leading edges of said pulse signal and the periods based on trailing edges of said pulse signal that are recorded in said velocity information recording section.

4. The movement condition computing device as set forth in claim 3, wherein when the stop state of the mobile body is judged by the state judgment section, the minimum output velocity computing section computes the minimum output velocity based on the period that was recorded in the velocity information recording section immediately prior to the stopping of said mobile body.

5. The movement condition computing device as set forth in claim 3, wherein when the start state of the mobile body is judged by the state judgment section, the minimum output velocity computing section computes the minimum output velocity from a period based on a leading edge or a trailing edge of the pulse signal that is recognized after the starting of said moving body.

6. The movement condition computing device as set forth in claim 1, further comprising an acceleration information acquisition section, acquiring acceleration information concerning the acceleration of the moving body;

an acceleration information recording section, recording acceleration information acquired at the acceleration information acquisition section; and a state judgment section, judging at least one of start and stop states of said mobile body from the state information acquired at the state information acquisition section; and wherein upon recognizing that at least one of start and stop states of said mobile body has been judged at the state judgment section, the minimum output velocity computing section computes the minimum output velocity based on the acceleration information recorded in said acceleration information recording section.

7. The movement condition computing device as set forth in claim 1, wherein the movement condition computing section computes, from the state information acquired at the state information acquisition section, a period in which velocity information could not be acquired and computes at least one of movement distance information and movement velocity information on the mobile body based on the minimum output velocity computed at the minimum output velocity computing section and on said computed period.

8. The movement condition computing device as set forth in claim 1, further comprising:

a distance correction section, correcting, based on an error value of the state information acquired at the state information acquisition section, at least one of movement distance information and movement velocity information on the mobile body that was computed at the movement condition computing section.

9. A movement condition computing device comprising:

a velocity information acquisition section, which acquires velocity information concerning the velocity of a mobile body;

an acceleration information acquisition section, which acquires acceleration information concerning the acceleration of said mobile body; and a movement condition computing section, which, when said velocity information acquisition section cannot acquire said velocity information during movement of said mobile body, computes at least one of movement distance information and movement velocity information on said mobile body based on the acceleration information acquired at said acceleration information acquisition section.

10. The movement condition computing device as set forth in claim 9, further comprising:

an acceleration information recording section, recording the acceleration information acquired at said acceleration information acquisition section; and a state judgment section, judging at least one of start and stop states of the mobile body from the acceleration information acquired at the acceleration information acquisition section; and wherein, when at least one of start and stop states of said mobile body has been judged at said state judgment section, the movement condition computing section computes at least one of movement distance information and movement velocity information on said mobile body based on the acceleration information recorded in said acceleration information recording section.

11. The movement condition computing device as set forth in claim 9, further comprising:

a conversion process section, converting the acceleration information acquired at the acceleration information acquired section into velocity information; and wherein the movement condition computing section computes at least one of movement distance information and movement velocity information on said mobile body by integrating the velocity information resulting from conversion at said conversion process section.

12. The movement condition computing device as set forth in claim 9, further comprising:

a distance correction section, correcting, based on an error value of the acceleration information acquired at the acceleration information acquisition section, at least one of movement distance information and movement velocity information on the mobile body that was computed at the movement condition computing section.

13. A movement condition computing method comprising the steps of:

acquiring velocity information concerning the velocity of a mobile body;

computing, when said velocity information cannot be acquired during movement of said mobile body, a minimum output velocity of a point in time at which said velocity information could be acquired;

acquiring state information concerning at least one of start and stop states of said mobile body; and computing at least one of movement distance information and movement velocity information on said mobile body based on said minimum output velocity that has been computed and said state information that has been acquired.

14. A movement condition computing program operable in a computer for performing a movement condition computing method, the program including a set of computer-executable instructions stored on a recording medium, the set of instructions comprising at least an instruction for:

acquiring velocity information concerning the velocity of a mobile body;

computing, when said velocity information cannot be acquired during movement of said mobile body, a minimum output velocity of a point in time at which said velocity information could be acquired;

acquiring state information concerning at least one of start and stop states of said mobile body; and computing at least one of movement distance information and movement velocity information on said mobile body based on said minimum output velocity that has been computed and said state information that has been acquired.

15. A recording medium having recorded thereon a set of computer-executable instructions for performing a method, the set of instructions comprising at least an instruction for:

acquiring velocity information concerning the velocity of a mobile body;

computing, when said velocity information cannot be acquired during movement of said mobile body, a minimum output velocity of a point in time at which said velocity information could be acquired;

acquiring state information concerning at least one of start and stop states of said mobile body; and computing at least one of movement distance information and movement velocity information on said mobile body based on said minimum output velocity that has been computed and said state information that has been acquired.

16. A navigation device comprising:

a present position determination section; and a movement condition computing device which comprises:

a velocity information acquisition section, acquiring velocity information concerning the velocity of a mobile body, a minimum output velocity computing section, computing, when said velocity information acquisition section cannot acquire said velocity information during movement of said mobile body, a minimum output velocity of a point in time at which said velocity information acquisition section could acquire said velocity information, a state information acquisition section, acquiring state information on at least one of start and stop states of said mobile body, and a movement condition computing section, computing at least one of movement distance information and movement velocity information on said mobile body based on the minimum output velocity computed at said minimum output velocity computing section and the state information acquired at said state information acquisition section, the present position determination section determining the present position of a mobile body based on movement distance information and movement velocity information computed by the movement condition computing device.

* * * * *